United States Patent
Kryzak et al.

(10) Patent No.: US 7,421,014 B2
(45) Date of Patent: Sep. 2, 2008

(54) CHANNEL BONDING OF A PLURALITY OF MULTI-GIGABIT TRANSCEIVERS

(75) Inventors: Joseph Neil Kryzak, Ames, IA (US); Aaron J. Hoelscher, Ankeny, IA (US); Thomas E. Rock, Richmond, IL (US)

(73) Assignee: XILINX, Inc., San Jose, CA (US)

( * ) Notice: Subject to any disclaimer, the term of this patent is extended or adjusted under 35 U.S.C. 154(b) by 1128 days.

(21) Appl. No.: 10/659,974

(22) Filed: Sep. 11, 2003

(65) Prior Publication Data
US 2005/0058186 A1 Mar. 17, 2005

(51) Int. Cl.
H04B 1/38 (2006.01)
H04L 5/16 (2006.01)

(52) U.S. Cl. ............ 375/219; 375/222; 375/220; 370/535; 455/73; 455/88; 455/507

(58) Field of Classification Search ........ 375/219, 375/220, 222; 370/535; 455/73, 88, 507
See application file for complete search history.

(56) References Cited

U.S. PATENT DOCUMENTS

| | | |
|---|---|---|
| 4,758,985 A | 7/1988 | Carter |
| 4,855,669 A | 8/1989 | Mahoney |
| 5,072,418 A | 12/1991 | Boutaud et al. |
| 5,142,625 A | 8/1992 | Nakai |
| RE34,363 E | 8/1993 | Freeman |
| 5,274,570 A | 12/1993 | Izumi et al. |
| 5,311,114 A | 5/1994 | Sambamurthy et al. |
| 5,339,262 A | 8/1994 | Rostoker et al. |
| 5,347,181 A | 9/1994 | Ashby et al. |
| 5,361,373 A | 11/1994 | Gilson |
| 5,457,410 A | 10/1995 | Ting |
| 5,473,267 A | 12/1995 | Stansfield |
| 5,500,943 A | 3/1996 | Ho et al. |
| 5,504,738 A | 4/1996 | Sambamurthy et al. |

(Continued)

FOREIGN PATENT DOCUMENTS

EP 0315275 A2 10/1989

(Continued)

OTHER PUBLICATIONS

U.S. Appl. No. 10/660,234, filed Sep. 11, 2003, Boecker.

(Continued)

*Primary Examiner*—Ted Wang
(74) *Attorney, Agent, or Firm*—Timothy W. Markison

(57) ABSTRACT

A method for channel bonding begins when a master transceiver receives a channel bonding sequence. The process continues with the master transceiver generating a channel bonding request and transmitting it and channel bonding configuration information to the slave transceiver. The process continues with each slave receiving the channel bonding sequence, the channel bonding request and the channel bonding configuration information. The process continues as each slave processes the channel bonding request and the channel bonding sequence in accordance with the channel bonding configuration information to determine individual slave channel bonding start information. The process continues as the master processes the channel bonding sequence in accordance with the channel bonding configuration information and the channel bonding request to determine master channel bonding start information.

45 Claims, 10 Drawing Sheets

U.S. PATENT DOCUMENTS

| | | | |
|---|---|---|---|
| 5,537,601 A | 7/1996 | Kimura et al. | |
| 5,543,640 A | 8/1996 | Sutherland et al. | |
| 5,550,782 A | 8/1996 | Cliff et al. | |
| 5,552,722 A | 9/1996 | Kean | |
| 5,563,891 A | 10/1996 | Wang | |
| 5,574,930 A | 11/1996 | Halverson, Jr. et al. | |
| 5,574,942 A | 11/1996 | Colwell et al. | |
| 5,581,745 A | 12/1996 | Muraoka | |
| 5,600,845 A | 2/1997 | Gilson | |
| 5,652,904 A | 7/1997 | Trimberger | |
| 5,671,355 A | 9/1997 | Collins | |
| 5,705,938 A | 1/1998 | Kean | |
| 5,732,250 A | 3/1998 | Bates et al. | |
| 5,737,631 A | 4/1998 | Trimberger | |
| 5,740,404 A | 4/1998 | Baji | |
| 5,742,179 A | 4/1998 | Sasaki | |
| 5,742,180 A | 4/1998 | DeHon et al. | |
| 5,748,979 A | 5/1998 | Trimberger | |
| 5,752,035 A | 5/1998 | Trimberger | |
| 5,760,607 A | 6/1998 | Leeds et al. | |
| 5,809,517 A | 9/1998 | Shimura | |
| 5,835,405 A | 11/1998 | Tsui et al. | |
| 5,874,834 A | 2/1999 | New | |
| 5,889,788 A | 3/1999 | Pressly et al. | |
| 5,892,961 A | 4/1999 | Trimberger | |
| 5,914,616 A | 6/1999 | Young et al. | |
| 5,914,902 A | 6/1999 | Lawrence et al. | |
| 5,933,023 A | 8/1999 | Young | |
| 5,970,254 A | 10/1999 | Cooke et al. | |
| 6,011,407 A | 1/2000 | New | |
| 6,020,755 A | 2/2000 | Andrews et al. | |
| 6,026,481 A | 2/2000 | New et al. | |
| 6,096,091 A | 8/2000 | Hartmann | |
| 6,154,051 A | 11/2000 | Nguyen et al. | |
| 6,163,166 A | 12/2000 | Bielby et al. | |
| 6,172,990 B1 | 1/2001 | Deb et al. | |
| 6,178,541 B1 | 1/2001 | Joly et al. | |
| 6,181,163 B1 | 1/2001 | Agrawal et al. | |
| 6,211,697 B1 | 4/2001 | Lien et al. | |
| 6,242,945 B1 | 6/2001 | New | |
| 6,272,655 B1 | 8/2001 | Mason et al. | |
| 6,279,045 B1 | 8/2001 | Muthujumaraswathy et al. | |
| 6,282,627 B1 | 8/2001 | Wong et al. | |
| 6,301,696 B1 | 10/2001 | Lien et al. | |
| 6,343,207 B1 | 1/2002 | Hessel et al. | |
| 6,353,331 B1 | 3/2002 | Shimanek | |
| 6,356,987 B1 | 3/2002 | Aulas | |
| 6,389,558 B1 | 5/2002 | Herrmann et al. | |
| 6,434,735 B1 | 8/2002 | Watkins | |
| 6,460,172 B1 | 10/2002 | Insenser Farre et al. | |
| 6,467,009 B1 | 10/2002 | Winegarden et al. | |
| 6,480,989 B2 | 11/2002 | Chan et al. | |
| 6,483,342 B2 | 11/2002 | Britton et al. | |
| 6,507,942 B1 | 1/2003 | Calderone et al. | |
| 6,510,548 B1 | 1/2003 | Squires | |
| 6,518,787 B1 | 2/2003 | Allegrucci et al. | |
| 6,519,753 B1 | 2/2003 | Ang | |
| 6,522,167 B1 | 2/2003 | Ansari et al. | |
| 6,532,572 B1 | 3/2003 | Tetelbaum | |
| 6,539,508 B1 | 3/2003 | Patrie et al. | |
| 6,541,991 B1 | 4/2003 | Hornchek et al. | |
| 6,563,821 B1 * | 5/2003 | Hong et al. | 370/389 |
| 6,578,174 B2 | 6/2003 | Zizzo | |
| 6,587,995 B1 | 7/2003 | Duboc et al. | |
| 6,588,006 B1 | 7/2003 | Watkins | |
| 6,601,227 B1 | 7/2003 | Trimberger | |
| 6,604,228 B1 | 8/2003 | Patel et al. | |
| 6,611,951 B1 | 8/2003 | Tetelbaum et al. | |
| 6,650,140 B2 | 11/2003 | Lee et al. | |
| 6,662,285 B1 | 12/2003 | Douglass et al. | |
| 6,693,918 B1 | 2/2004 | Dallabetta et al. | |
| 6,781,407 B2 | 8/2004 | Schultz | |
| 6,798,239 B2 | 9/2004 | Douglass et al. | |
| 6,886,092 B1 | 4/2005 | Douglass et al. | |
| 6,959,015 B1 | 10/2005 | Hwang et al. | |
| 6,983,405 B1 | 1/2006 | Herron et al. | |
| 6,996,758 B1 | 2/2006 | Herron et al. | |
| 7,076,595 B1 | 7/2006 | Dao et al. | |
| 7,088,767 B1 | 8/2006 | Cory | |
| 7,099,426 B1 * | 8/2006 | Cory et al. | 375/372 |
| 7,106,760 B1 * | 9/2006 | Perumal et al. | 370/535 |
| 7,187,709 B1 * | 3/2007 | Menon et al. | 375/219 |
| 7,295,639 B1 * | 11/2007 | Cory | 375/371 |

FOREIGN PATENT DOCUMENTS

| | | | |
|---|---|---|---|
| EP | 0 659 001 A | 6/1995 | |
| EP | 0 772 121 A | 5/1997 | |
| EP | 0 905 906 A2 | 3/1999 | |
| EP | 0 996 262 A | 4/2000 | |
| EP | 1 235 351 A1 | 8/2002 | |
| WO | WO 93 25968 A1 | 12/1993 | |

OTHER PUBLICATIONS

U.S. Appl. No. 10/660,449, filed Sep. 11, 2003, Cory et al.
U.S. Appl. No. 10/660,191, filed Sep. 11, 2003, Kryzak et al.
U.S. Appl. No. 10/660,062, filed Sep. 11, 2003, Groen et al.
U.S. Appl. No. 10/660,448, filed Sep. 11, 2003, Groen et al.
U.S. Appl. No. 10/659,803, filed Sep. 11, 2003, Black et al.
U.S. Appl. No. 10/659,819, filed Sep. 11, 2003, Groen et al.
U.S. Appl. No. 10/659,971, filed Sep. 11, 2003, Boecker et al.
U.S. Appl. No. 10/660,254, filed Sep. 11, 2003, Groen et al.
U.S. Appl. No. 10/661,016, filed Sep. 11, 2003, Groen et al.
U.S. Appl. No. 10/659,979, filed Sep. 11, 2003, Kryzak et al.
U.S. Appl. No. 10/659,972, filed Sep. 11, 2003, Shafer.
U.S. Appl. No. 10/660,159, filed Sep. 11, 2003, Groen et al.
U.S. Appl. No. 10/660,016, filed Sep. 11, 2003, Jenkins.
U.S. Appl. No. 10/660,973, filed Sep. 11, 2003, Groen et al.
U.S. Appl. No. 10/660,190, filed Sep. 11, 2003, Groen.
U.S. Appl. No. 10/659,916, filed Sep. 11, 2003, Black et al.
U.S. Appl. No. 10/659,978, filed Sep. 11, 2003, Groen et al.
U.S. Appl. No. 10/660,235, filed Sep. 11, 2003, Boecker et al.
U.S. Appl. No. 10/659,966, filed Sep. 11, 2003, Chuang et al.
U.S. Appl. No. 10/660,243, filed Sep. 11, 2003, Shafer et al.
Albaharna, Osama T., "Area & Time Limitations of FPGA-Based Virtual Hardware," IEEE, Apr. 1994, pp. 184-189, IEEE, 3 Park Avenue, 17th Floor, New York, NY 10016-5997.
Andrew, William B. et al., "A Field Programmable System Chip which Combines FPGA & ASIC Circuitry," IEEE, May 16, 1999, pp. 183-186, IEEE, 3 Park Avenue, 17th Floor, New York, NY 10016-5997.
Carter, William S., "The Future of Programmable Logic and its Impact on Digital System Design," Apr. 1994, IEEE, pp. 10-16, IEEE, 3 Park Avenue, 17th Floor, New York, NY 10016-5997.
Davidson, Jacob, "FPGA Implementation of Reconfigurable Microprocessor," IEEE, Mar. 1993, pp. 3.2.1 - 3.2.4, IEEE, 3 Park Avenue, 17th Floor, New York, NY 10016-5997.
Dehon, Andre, "DPGA-Coupled Microprocessors: Commodity ICs for the Early 21st Century," IEEE, Feb. 1994, pp. 31 - 39, IEEE, 3 Park Avenue, 17th Floor, New York, NY 10016-5997.
French, P.C. et al., "A Self-Reconfiguring Processor,"; IEEE, Jul. 1993, pp. 50-59, IEEE, 3 Park Avenue, 17th Floor, New York, NY 10016-5997.
International Business Machines, "Powerpc 405 Embedded Processor Core User Manual," 1996, 5th Ed., pp. 1-1 to X-16, International Business Machines, 1580 Rout 52, Bldg. 504, Hopewell Junction, NY 12533-6531.
International Business Machines, "Processor Local Bus" Architecture Specifications, 32-Bit Implementation, Apr. 2000, First Edition, v2.9, pp. 1-76, IBM Corporation. Department H83A, P.O. Box 12195, Research Triangle Park, NC 27709.
Iseli, Christian et al., "AC++ Compiler for FPGA Custom Execution Units Synthesis," 1995, pp. 173-179, IEEE, 3 Park Avenue, 17th Floor, New York, NY 10016-5997.

Iseli, Christian et al., "Beyond Superscaler Using FPGA's," IEEE, Apr. 1993, pp. 486-490, IEEE, 3 Park Avenue, 17th Floor, New York, NY 10016-5997.

Iseli, Christian et al., "Spyder: A Reconfigurable VLIW Processor Using FPGA's, " IEEE, Jul. 1993, pp. 17-24, IEEE, 3 Park Avenue, 17th Floor, New York, NY 10016-5997.

Kiaei, Sayfe et al., "VLSI Design of Dynamically Reconfigurable Array Processor-Drap," IEEE, Feb. 1989, pp. 2484-2488, V3.6, IEEE, 3 Park Avenue, 17th Floor, New York, NY 10016-5997.

Maki, G. et al., "A Reconfigurable Data Path Processor," IEEE, Aug. 1991, pp. 18-4.1 to 18-4.4, IEEE, 3 Park Avenue, 17th Floor, New York, NY 10016-5997.

Snyder, Cary D. et al., "Xilinx's A-to-Z System Platform," Cahners Microprocessor Report, Feb. 26, 2001, pp. 1-5, Microdesign Resources, www.MDRoline.com, 408-328-3900.

Srini, Vason P., "Field Programmable Gate Array (FPGA) Implementation of Digital Systems: An Alternative to ASIC," IEEE, May 1991, pp. 309-314, IEEE, 3 Park Avenue, 17th Floor, New York, NY 10016-5997.

Wirthlin, Michael J. et al., "The Nano Processor: A Low Resource Reconfigurable Processor," IEEE, Feb. 1994, pp. 23-30, IEEE, 3 Park Avenue, 17th Floor, New York, NY 10016-5997.

Wittig, Ralph D. et al., ONECHIP: An FPGA Processor with Reconfigurable Logic, Apr. 17, 1996, pp. 126-135, IEEE, 3 Park Avenue, 17th Floor, New York, NY 10016-5997.

Xilinx, Inc., "The Programmable Logic Data Book," 1994, Revised 1995, Xilinx, Inc., 2100 Logic Drive, San Jose, CA. 95124.

Xilinx, Inc., "The Programmable Logic Data Book," 1994, Revised 1995, pp. 2-109 to 2-117, Xilinx, Inc., 2100 Logic Drive, San Jose, Ca. 95124.

Xilinx, Inc., "The Programmable Logic Data Book," 1994, Revised 1995, pp. 2-9 to 2-18, Xilinx, Inc., 2100 Logic Drive, San Jose, CA. 95124.

Xilinx, Inc., "The Programmable Logic Data Book," 1994, Revised 1995, pp. 2-187 to 2-199, Xilinx, Inc., 2100 Logic Drive, San Jose, CA. 95124.

Xilinx, Inc., "The Programmable Logic Data Book," 1994, Revised 1995, pp. 2-107 to 2-108, Xilinx, Inc., 2100 Logic Drive, San Jose, CA. 95124.

Xilinx, Inc., "The Programmable Logic Data Book," 2000, Ch 3, pp. 3-7 to 3-17; 3-76 to 3-87, Xilinx, Inc., 2100 logic Drive, San Jose, CA. 95124.

Xilinx, Inc., "The Programmable Logic Data Book, " 2000, Ch. 3 pp. 3-1 to 3-17, Xilinx, Inc., 2100 Logic Drive, San Jose, CA 95124.

Xilinx, Inc., "The Programmable Logic Data Book," Jan. 27, 1999, Ch. 3, pp. 3-1 to 3-50, Xilinx, Inc., 2100 Logic Drive, San Jose, CA 95124.

Xilinx, Inc., Virtex II Platform FPGA Handbook, Dec. 6, 2000, vol. 1.1, pp. 33-75, Xilinx, Inc., 2100 Logic Drive, San Jose, CA. 95124.

Yamin Ll et al., "Aizup-A pipelined Processor Design & Implementation on Xilinx FPGA CHIP," IEEE, Sep. 1996, pp. 98-106, 98-106, IEEE, 3 Park Avenue, 17th Floor, New York, NY 10016-5997.

09/858,732, filed May 15, 2001, Shultz, David P. entitled "Microprocessor with Programmable Logic in the Data Path", Xilinx, Inc., 2100 Logic Drive, San Jose, CA. 95124.

10/082,490, filed Feb. 22, 2002, Cory, Warren, E., entitled "Channel Bonding Control Logic Architecture", Xilinx, Inc., 2100 Logic Drive, San Jose, CA. 95124.

10/660,449 filed Sep. 11, 2003, Cory et al., entitled "Variable Latency Buffer and Method of Operation", Xilinx, Inc., 2100 Logic Drive, San Jose, CA. 95124.

\* cited by examiner programmable logic device 10

*Figure 2* programmabl MGT 14 - 28 programmable receive PCS module 44 channel bonding module 90

CHANNEL BONDING OF A PLURALITY OF MULTI-GIGABIT TRANSCEIVERS

BACKGROUND OF THE INVENTION

1. Technical Field

This invention relates generally to general-purpose integrated circuits and more particularly to integrated circuits having a plurality of serial transceivers.

2. Description of Related Art

As is known, integrated circuits (ICs) may be fabricated using a variety of technologies (e.g., CMOS, gallium arsenide, silicon germanium, bi-polar, etc.) to provide an endless list of electronic circuits. For example, microprocessors, read only memory (ROM), static random access memory (SRAM), dynamic random access memory (DRAM), field programmable gate arrays (FPGA), and digital signal processors (DSP) are typically fabricated using CMOS technology and provide vast programmable electronic circuits and/or data storage.

As the amount of data processed by such ICs increases and the time to process such data decreases, getting the data on to and off of the chip in sufficient amounts and in a timely manner presents an ever increasing IC design challenge. One common solution to this problem is to increase the width of the input and output interfaces of the IC. For instance, the data may be provided in parallel in 32 bit data words, 64 bit data words, etc. While this technique meets its objective, it requires the IC to a large number of pins to accommodate the large parallel inputs and outputs, which increases the IC package size, increases die size, adds cost, and makes IC and printed circuit board (PCB) layouts more difficult.

Another solution is to include high-speed serial interfaces on the IC. As is known, a high-speed serial interface transmits and receives a serial stream of data, thus requiring only one IC pin for the transmit path and one IC pin for the receive path. As is further known, a high-speed interface converts received serial data into parallel data to correspond to the internal bus size of the IC. In addition, a high-speed serial interface, or transceiver, converts transmit parallel data into transmit serial data. When such high-speed serial interfaces are implemented using CMOS technology, the rate of the serial data is somewhat limited. For example, a 3.125 Gigabit-per-second (Gbps) serial data rate is about the maximum rate for 0.18 micron CMOS technology.

To achieve data rates above a technology limitation (e.g., the 3.125 Gbps for 0.18 micron CMOS), several serial channels may be operated in parallel, which is referred to as channel bonding. For example, to achieve a 12.5 Gbps data rate, four 3.125 Gbps transceivers may be bonded together (i.e., 4*3.125=12.5). In this example, each transceiver processes $\frac{1}{4}^{th}$ of the data, which is done at the same time as the other transceivers are processing their respective fourths of the data.

The technical challenge with channel bonding is to insure that each transceiver stays in step with all of the other transceivers, such that the ordering of the data is not lost during the parallel processing. For instance, in the four transceiver example, a first transceiver processes the first of every four bits of the input or output serial data, a second transceiver processes the second of every four bits of the input or output serial data, a third transceiver processes the third of every four bits of the input or output serial data, and a fourth transceiver processes the fourth of every four bits of the input or output serial data. If this ordering is lost, even temporarily, the received or transmitted data will be corrupted.

Due to channel bonding set-up latencies (i.e., the processing time to recognize initiation of channel bonding, to adjust memory access timing, and to allocate responsibilities to the transceivers), the number of transceivers that can be bonded together are limited. Typically, only about four 3.125 Gbps transceivers can be bonded together due to set-up latencies. As the dies size increases, the spacing of the transceivers may also increase, which adds to the set-up latencies. Further, consumer demands for even higher data rates (e.g., 40 Gbps) are increasing.

Therefore, a need exists for a technique of bonding a significant number of channels (i.e., high-speed serial transceivers) to achieve high data rates without limitation due to set-up latencies.

BRIEF SUMMARY OF THE INVENTION

The channel bonding of a plurality of multi-gigabit transceivers of the present invention substantially meets these needs and others. In one embodiment, a method for channel bonding a plurality of multi-gigabit transceivers begins when a master transceiver of the plurality of multi-gigabit transceivers receives a channel bonding sequence (i.e., an indication for channel bonding, which includes the desired data rate, the number of channels being bonding, and channel assignments). The process continues with the master transceiver generating a channel bonding request (e.g., specific slave channel bonding responsibilities) in response to the channel bonding sequence. The process continues with the master transceiver transmitting the channel bonding request and channel bonding configuration information (e.g., number of slaves, propagation delays, and clock correction information) to slave transceivers of the plurality of multi-gigabit transceivers.

The process continues with each of the slave transceivers receiving the channel bonding sequence and, at the same or a different time, receiving the channel bonding request and the channel bonding configuration information. The process continues as each of the slave transceivers processes the channel bonding request and the channel bonding sequence in accordance with the channel bonding configuration information to determine individual slave channel bonding start information. The process continues as the master transceiver processes the channel bonding sequence in accordance with the channel bonding configuration information and the channel bonding request to determine master channel bonding start information.

The process continues by commencing channel bond writing of respective data to and reading of the respective data from corresponding buffers by the master transceiver and the slave transceivers in accordance with the individual slave channel bonding start information and the master channel bonding start information. With such a method, propagation delays of processing the channel bonding set-up are accounted for and, as such, can be factored into setting up a wide channel (e.g., a large number of transceivers bonded together).

In another embodiment, a method for channel bonding by a multi-gigabit transceiver begins by determining whether the multi-gigabit transceiver is a master transceiver or a slave transceiver. When the multi-gigabit transceiver is the slave transceiver, the process continues by detecting a channel bonding sequence at a given time to produce a detected channel bond sequence. The slave process continues by delaying the detected channel bonding sequence for a predetermined period of time to produce a delayed channel bonding sequence. The slave process continues by receiving a channel bonding request at a second given time. The slave process continues by determining whether the receiving of channel bonding request and the delayed channel bonding sequence are within a time window.

When the receiving of channel bonding request and the delayed channel bonding sequence are within the time window, the slave process continues by aligning data with respect to data alignment of the master transceiver to produce aligned data. The slave process continues by synchronizing the aligned data with data of the master transceiver. With such a method, propagation delays of processing the channel bonding set-up are accounted for and, as such, can be factored into setting up a wide channel (e.g., a large number of transceivers bonded together).

An embodiment of a channel bonding module for a multi-gigabit transceiver includes a channel bonding sequence comparator, a pointer generation module, and a channel bonding processing module. The channel bonding sequence comparator is operably coupled to a buffer of the multi-gigabit transceiver that temporarily stores received parallel data. As coupled, the channel bonding sequence comparator compares data blocks (e.g., data word lines of the buffer) of the received parallel data with a channel bonding sequence. When a current data block of the data blocks of the received parallel data substantially matches the channel bonding sequence, the channel bonding sequence comparator generates a channel bonding sequence detect signal. The pointer generation module is operably coupled to generate a read pointer and a write pointer for reading to and writing from the buffer.

The channel bonding processing module is operably coupled to: generate a channel bonding sequence address based on the write pointer and the channel bonding sequence detect signal; generate a channel bonding start address based on the channel bonding sequence address and channel bonding configuration information; generate a channel bonding start indication based on the channel bonding configuration information; and provide the channel bonding start address and the channel bonding start indication to the pointer generation module such that, at commencement of channel bonding, the write pointer corresponds to the channel bonding start address. With such a module, propagation delays of processing the channel bonding set-up are accounted for and, as such, can be factored into setting up a wide channel (e.g., a large number of transceivers bonded together).

DETAILED DESCRIPTION OF THE INVENTION

Figure 1:
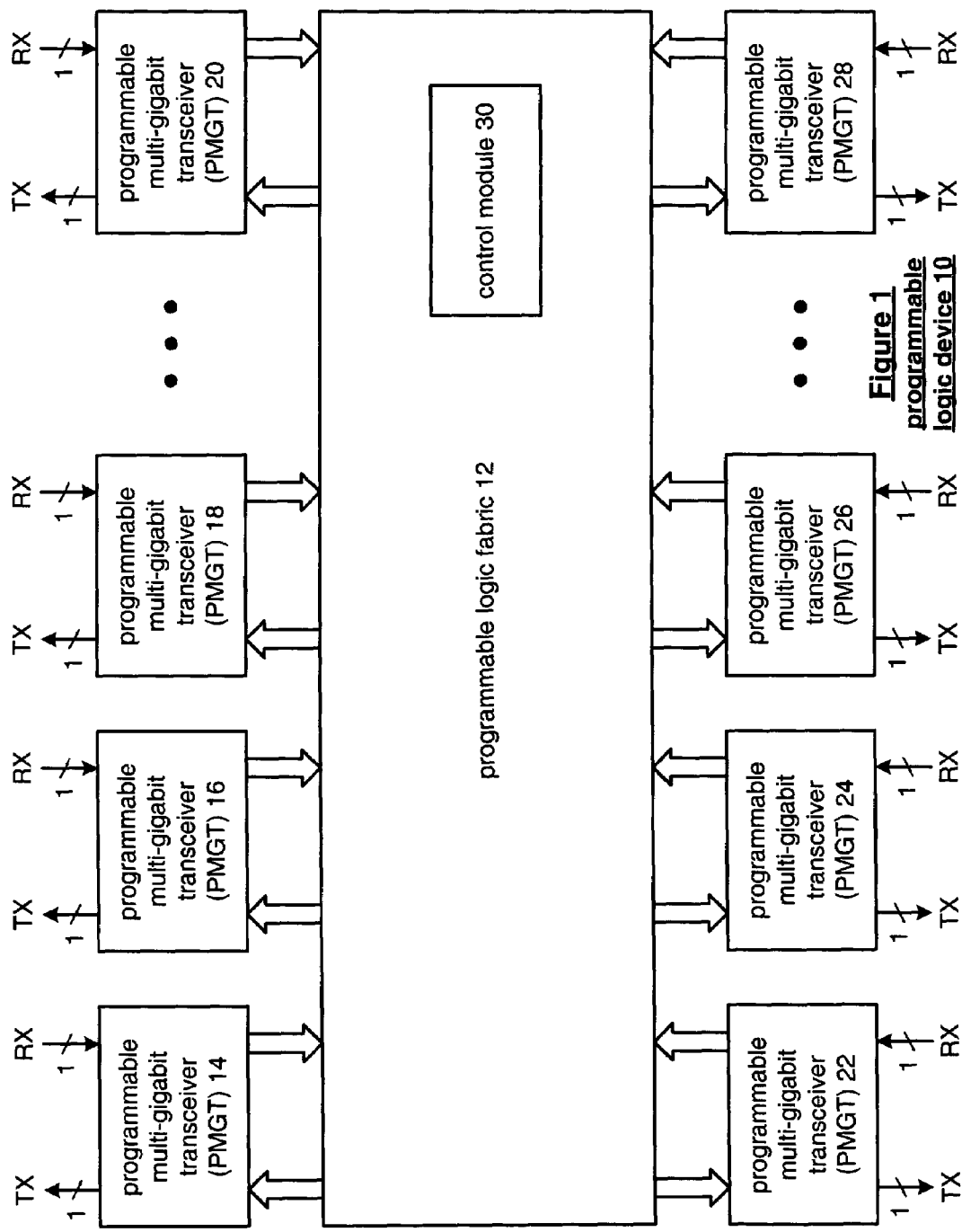
FIG. 1 is a schematic block diagram of a programmable logic device in accordance with the present invention.

FIG. 1 is a schematic block diagram of a programmable logic device 10 that includes programmable logic fabric 12, a plurality of programmable multi-gigabit transceivers (PMGT) 14-28 and a control module 30. The programmable logic device 10 may be a programmable logic array device, a programmable array logic device, an erasable programmable logic device, and/or a field programmable gate array (FPGA). When the programmable logic device 10 is a field programmable gate array (FPGA), the programmable logic fabric 12 may be implemented as a symmetric array configuration, a row-based configuration, a sea-of-gates configuration, and/or a hierarchical programmable logic device configuration. The programmable logic fabric 12 may further include at least one dedicated fixed processor, such as a microprocessor core, to further facilitate the programmable flexibility offered by a programmable logic device 10.

The control module 30 may be contained within the programmable logic fabric 12 or it may be a separate module. In either implementation, the control module 30 generates the control signals to program each of the transmit and receive sections of the programmable multi-gigabit transceivers 14-28. In general, each of the programmable multi-gigabit transceivers 14-28 performs a serial-to-parallel conversion on received data and performs a parallel-to-serial conversion on transmit data. The parallel data may be 8-bits, 16-bits, 32-bits, 64-bits, et cetera wide. Typically, the serial data will be a 1-bit stream of data that may be a binary level signal, multi-level signal, etc. Further, two or more programmable multi-gigabit transceivers may be bonded together to provide greater transmitting speeds. For example, if multi-gigabit transceivers 14, 16 and 18 are transceiving data at 3.125 gigabits-per-second, the transceivers 14-18 may be bonded together such that the effective serial rate is 3 times 3.125 gigabits-per-second. Channel bonding will be described in greater detail with reference to FIGS. 3-11.

Each of the programmable multi-gigabit transceivers 14-28 may be individually programmed to conform to separate standards. In addition, the transmit path and receive path of each multi-gigabit transceiver 14-28 may be separately programmed such that the transmit path of a transceiver is supporting one standard while the receive path of the same transceiver is supporting a different standard. Further, the serial rates of the transmit path and receive path may be programmed from 1 gigabit-per-second to tens of gigabits-per-second. The size of the parallel data in the transmit and receive sections, or paths, is also programmable and may vary from 8-bits, 16-bits, 32-bits, 64-bits, et cetera.

Figure 2:
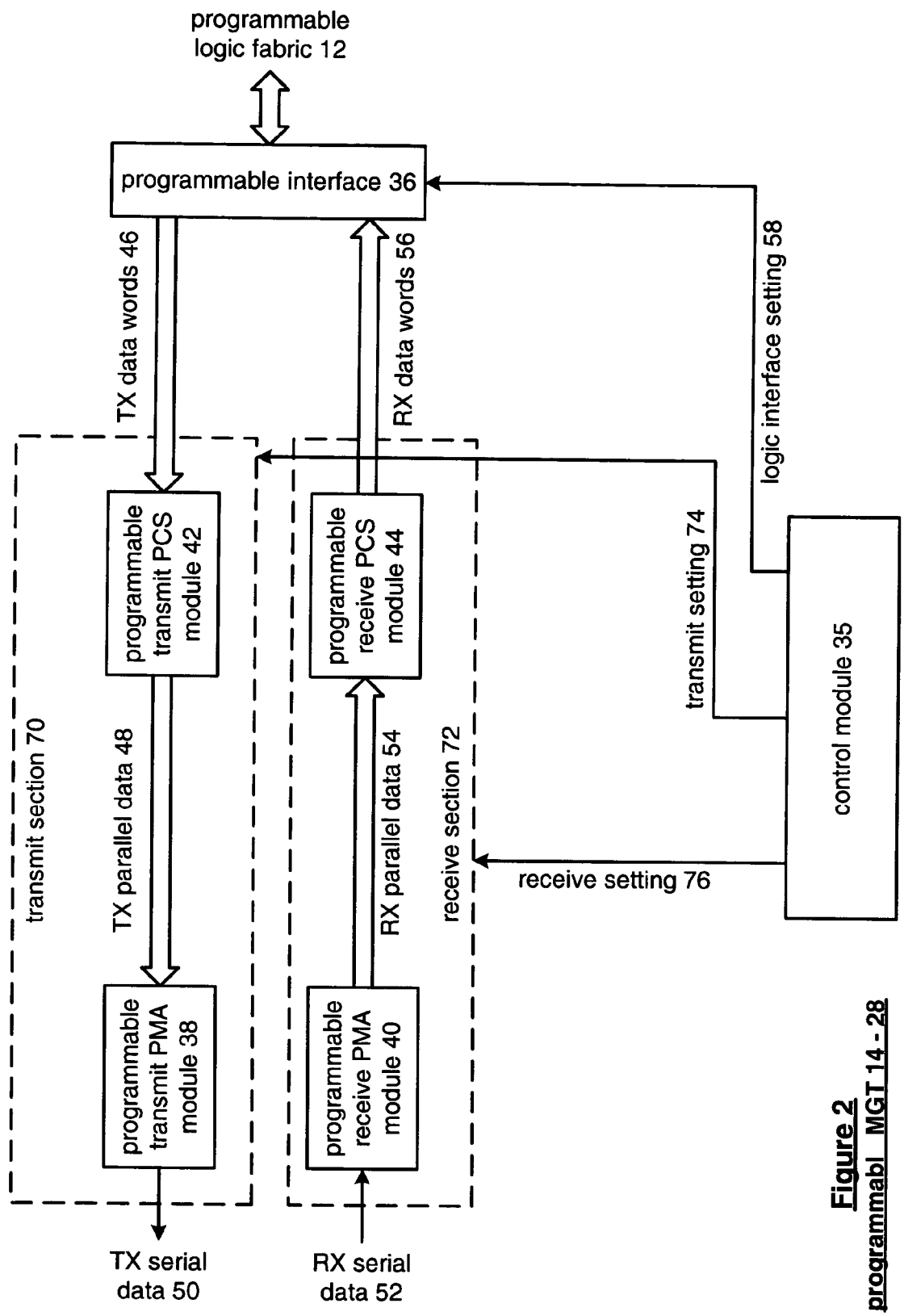
FIG. 2 is a schematic block diagram of a programmable multi-gigabit transceiver in accordance with the present invention.

FIG. 2 illustrates a schematic block diagram of a representative one of the programmable multi-gigabit transceivers 14-28. In this embodiment, the programmable multi-gigabit transceiver 14-28 includes a transmit section 70, a receive section 72, a control module 35 and a programmable interface 36. The transmit section 70 includes a programmable transmit PMA module 38 and a programmable transmit PCS module 42. The receive section 72 includes a programmable receive PMA module 40 and a programmable receive PCS module 44.

In operation, the programmable logic fabric 12 provides transmit data words 46, which may be 2 bytes, 4 bytes, 8 bytes, etc. in width, to the programmable transmit PCS module 42 via the programmable interface 36. The programmable transmit PCS module 42 converts the transmit data words 46 into transmit parallel data 48, which may be 8, 16, 32, 64, etc. bits in width. The programmable transmit PMA module 38 converts the transmit parallel data into transmit serial data 50.

The programmable receive PMA module 40 is operably coupled to convert receive serial data 52 into receive parallel data 54, which may be 8, 16, 32, 64, etc. bits in width. The programmable receive PCS module 44, which will be described in greater detail with reference to FIG. 3, converts the receive parallel data 54 into receive data words 56, which may be 2 bytes, 4 bytes, 8 bytes, etc. in width. The programmable receive PCS module 44 provides the receive data words 56 to the programmable logic fabric 12 via the programmable interface 36.

In this embodiment, the control module 35 programs the transmit section 70 and the receive section 72 via transmit setting 74 and receive setting 76, respectively. The control module 35 also programs the programmable interface 36 via the logic interface setting 58. Accordingly, the control module 35 may program the receiver section 72 to function in accordance with one standard while programming the transmit section 70 in accordance with another standard and to participate in channel bonding. Further, the logic interface setting 58 may indicate that the transmit data words 46 are received from the programmable logic fabric 12 at a different rate than the receive data words 56 are provided to the programmable logic fabric 12. As one of average skill in the art will appreciate, the programmable interface 36 may include a transmit buffer and a receive buffer, and/or an elastic store buffer to facilitate the providing and receiving of the data words 56 and 46 to-and-from the programmable logic fabric 12.

Figure 3:
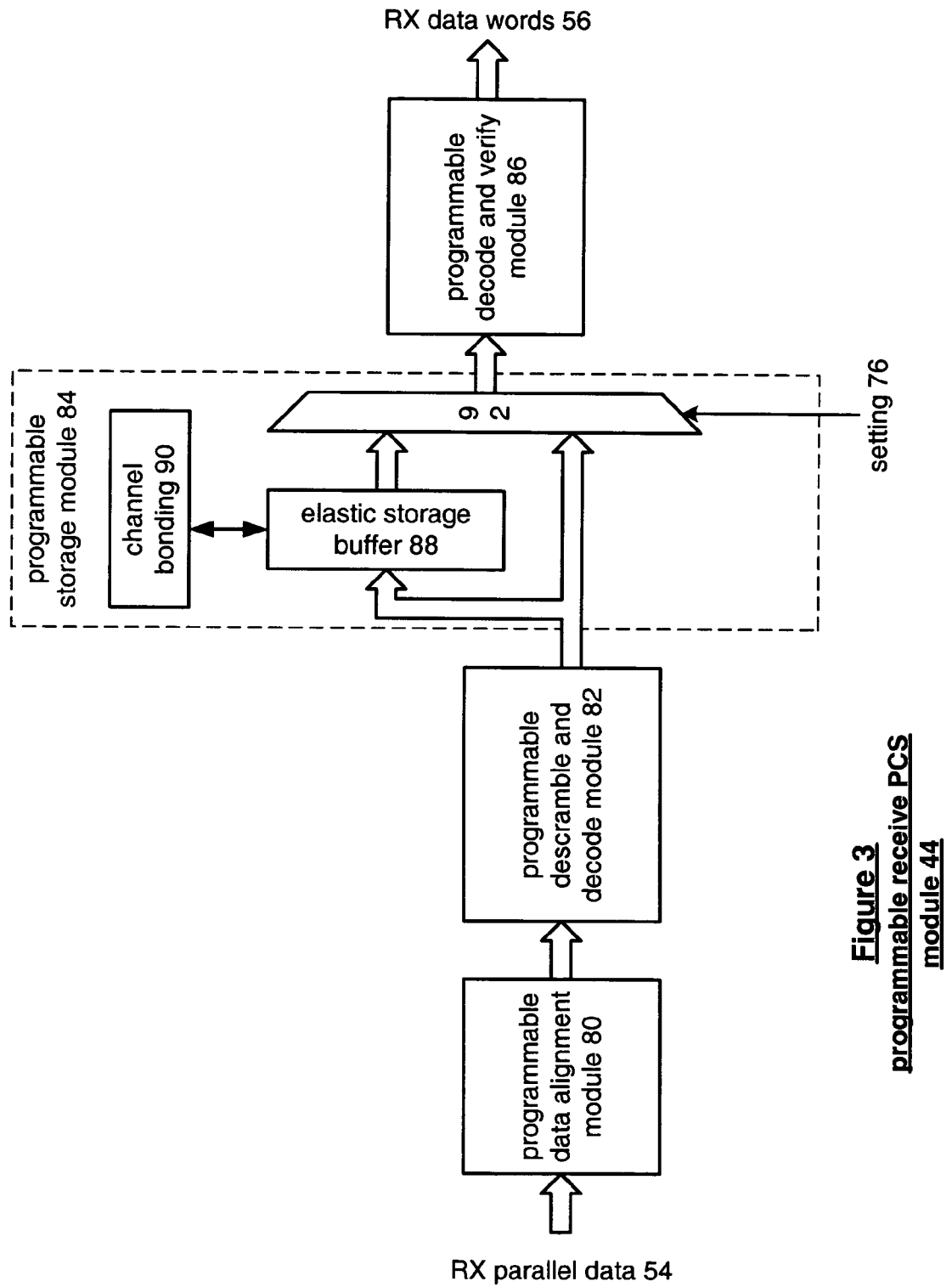
FIG. 3 is a schematic block diagram of a programmable receive physical coding sublayer module in accordance with the present invention.

FIG. 3 is a schematic block diagram of a programmable receive PCS module 44 that includes a programmable data alignment module 80, a programmable descramble and decode module 82, a programmable storage module 84, and a programmable decode and verify module 86. The programmable storage module 84 includes a channel bonding module 90, an elastic storage buffer 88 and a multiplexer 92.

In operation, the programmable data alignment module 170 receives the receive parallel data 54. Based on settings 76, the programmable data alignment module 80 may pass the receive parallel data 54 to the programmable descramble and decode module 82 without processing, may validate the receive parallel data prior to programmable descramble and decode module 82, and/or synchronize the validated data prior to providing it to the programmable descramble and decode module 82.

The programmable descramble and decode module 82 receives the output of multiplexer 184 and, based on setting 76, either passes the data unprocessed to the programmable storage module 84, descrambles the data prior to providing it to the programmable storage module 84, and/or decodes the data prior to providing it to the programmable storage module 84.

The programmable storage module 84 may buffer the data it receives from the programmable descramble and decode module 82 via the elastic store buffer 84 to facilitate channel bonding or pass the data directly to multiplexer 92. The channel bonding module 90, which will be discussed in greater detail with reference to FIGS. 4-11, enables the receiver of one programmable multi-gigabit transceiver to be linked or bonded with another receiver within another multi-gigabit transceiver to increase the effective serial data rate.

The programmable decode and verify module 86 receives the output of multiplexer 92 and passes it directly as the receive data word 56 in accordance with setting 76, processes the data via a cyclic redundancy check, and/or further decodes it to produce the receive data word 56.

Figure 4:
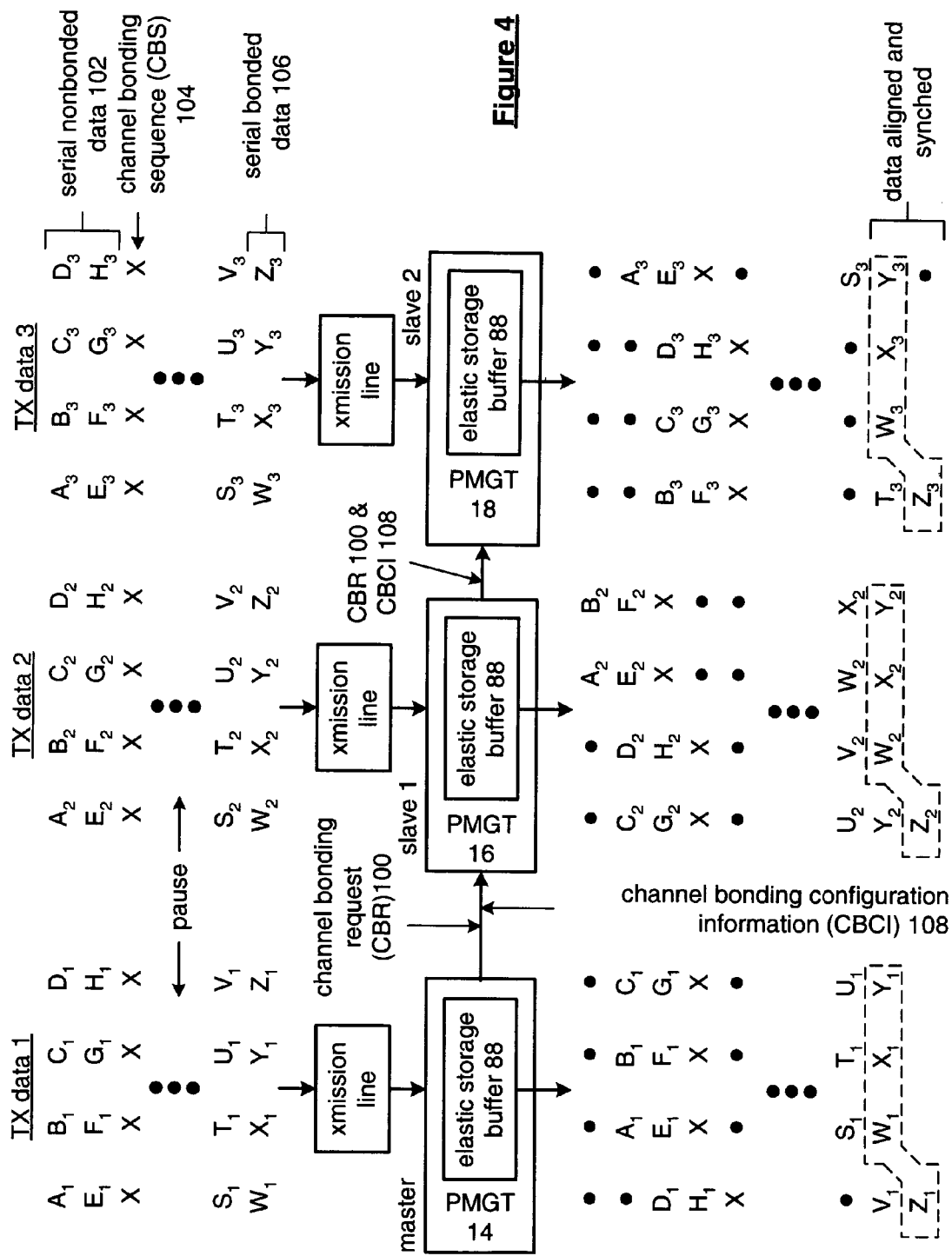
FIG. 4 is an illustrative of channel bonding in accordance with the present invention.

FIG. 4 is an illustrative of channel bonding of three channels. In this example, PMGT 14 has been designated as the master transceiver, while PMGTs 16 and 18 have been designated as slave transceivers. Typically, the user of the programmable logic device 10, or the user of an IC that includes a plurality of multi-gigabit transceivers, makes the master/slave designations. Alternatively, one of the transceivers may be selected as the master via a default mechanism. As another alternative, the master transceiver may be dynamically established upon channel bonding initiation.

As shown, MGT 14 receives TX data 1 via a transmission line, MGT 16 receives TX data 2 via a separate transmission line, and MGT 18 receives TX data 3 via yet another separate transmission line. In this example, the transmit data (TX data 1, 2, and 3) is a serial data stream that represents four byte data words. For instance, a first data word of TX data 1 includes four bytes ($A_1, B_1, C_1,$ and $D_1$), a first data word of TX data 2 includes four bytes ($A_2, B_2, C_2,$ and $D_2$), and a first data word of TX data 3 includes four bytes ($A_3, B_3, C_3,$ and $D_3$). As one of average skill in the art will appreciate, the data word size may correspond to a word line of the buffer 88, a multiple thereof, and/or to the bus width of the programmable logic device.

In this example, due to differences in the transmission lines (e.g., differing transmission line effects), each of the MGTs 14-18 receives, stores, and processes their respective data at slightly different times. In addition, due to slight differences in clock speeds of the MGTS, they each store and process their respective data from the elastic storage buffer 88 at slightly different rates. This is illustrated in that the first bytes of each of the first data words of the TX data 1, 2, and 3 (e.g., $A_1, A_2,$ and $A_3$) are placed on to their respective transmission lines in synch. However, as shown at the contents of the respective elastic storage buffers 88, the byte alignment of the data has shifted. For instance, MGT 16 is the first of the three transceivers to receive, store, and process the first byte of the first data word of TX data 2 (e.g., $A_2$). But does so in a shifted position with respect to the originally transmitted data (e.g., in byte position three as opposed to byte position one).

MGT 14 is the next MGT to receive, store, and process the first byte of the first data word of its corresponding TX data, but does so three bytes later than MGT 16 received its corresponding first byte of the first data word. As such, due to the different transmission line effects and processing speeds, MGT 14 is processing its first byte of its first data word on a different data word line than MGT 16. MGT 18 is the last MGT to process its first byte of its first data word.

As long as the TX data is serial nonbonded data 102, which corresponds to the first two data word lines of the TX data 1, 2, and 3 in this example, the differences in processing time and transmission line effects do not impact the performance of the MGTs since they are each processing independent data. However, when the MGTs are to be channel bonded, these differences need to be accounted for and corrected.

As shown, the third data word line of each TX data includes a channel bonding sequence, which is represented by a four-byte word (X, X, X, X). The channel bonding sequence includes channel bonding set up information, which includes one or more of, number of channels, physical sequence (i.e., which channel supports which bytes of the TX data), the byte width, channel bonding initiation. The channel bonding sequence may further identify the master transceiver. As shown, the channel bonding sequence 104 is synchronously transmitted within the TX data 1, 2, and 3, but is received, stored, and processed at slightly different times by each of the MGTs. As is further shown, the TX data transmissions pause for a specific period of time before transmitted serial bonded data 106. The duration of the pause depends on the channel bonding configuration. During the pause, the TX data 1, 2, and 3 may be stopped, or continued with null, don't care data or repeated transmission of the beginning data word line of the serial bonded data 106.

With MGT 14 as the master, when it detects the channel bonding sequence, it generates a channel bonding request (CBR) 100 and channel bonding configuration information (CBCI) 108, which it provides to slaves 1 and 2 (i.e., MGT 16 and MGT 18). Note that, depending on the channel bonding configuration, the master may provide the CBR 100 and CBCI 108 to each slave directly or indirectly through intervening slaves. The channel bonding request 100 is an indication to the slaves that a channel bond is being set up and provides a timing benchmark for the channel bond set up. The channel bonding configuration information 108 includes the number of slaves in the channel bond, the propagation delays of the slaves with respect to the master, and clock correction information. The clock correction information includes pointer separation information, an address offset, and an adjust enable signal.

To establish channel bonding, the master processes the channel bonding sequence to determine the channel bonding start. The slaves process the channel bonding sequence along with the channel bonding request 100 and the channel bonding configuration information 108 to identify the channel bonding start, and to align and synchronize the processing of its data with the processing of the data by the master. As shown, the first data word that can be bonded begins with a four byte word (W, X, Y, and Z) for each TX data 1, 2, and 3. Due to the transmission line effects and/or process speed, the master processes its data words shifted by one byte. This establishes the byte alignment for all of the slaves, which they must adjust to. Further, the processing speed at which the master reads and writes data into its corresponding buffer 88 provides the reading and writing rate to which the slaves must synchronize. In addition, the master determines, based on the maximum propagation delay of the channel bonding configuration, that the first data word that can be bonded is data word (W, X, Y, Z) This information may also be provided to the slaves.

While the channel bond is being established, the master and slaves are still independently operating. As such, until the channel bonding commences, the slaves continue to store data at its independent rate with its independent byte offset. However, upon processing the channel bonding sequence, the channel bonding request, and the channel bonding configuration information, each of the slaves knows when the channel bonding will begin, the first data word line of the bonded data, and the byte position of the data word line.

As shown, slave 1, which, in time, is ahead of the master, receives and processes the first data word that can be bonded prior to the master, thus it stores the data as it receives it. However, when the channel bonding begins, the first data word, or a portion thereof, is again stored in its buffer. As illustrated, slave 1 repeats the storing of bytes W, X and Y to obtain the alignment and synchronization with the master's storing of these bytes.

As is also shown, slave 2 is trailing, in time, the master's storing of data words. Thus, at the commencement of the channel bonding, slave 2 jumps ahead to the appropriate data word (W, X, Y, Z), thus omitting the storing of bytes U and V of the preceding data word, to obtain alignment and synchronization with the master.

With the slaves aligned and synchronized with the master, the resulting data of the corresponding buffers 88 of each of the MGTs is channel bonded. By including the propagation delays of the MGTs in the set up process, the latencies of channel bonding set up can be accounted for and factored into the channel bond establishment. As such, the number of transceivers that can be bonded together is limited only by the number of transceivers on an integrated circuit. Further, the slaves may be coupled to the master in a wide variety of configurations.

Figure 5:
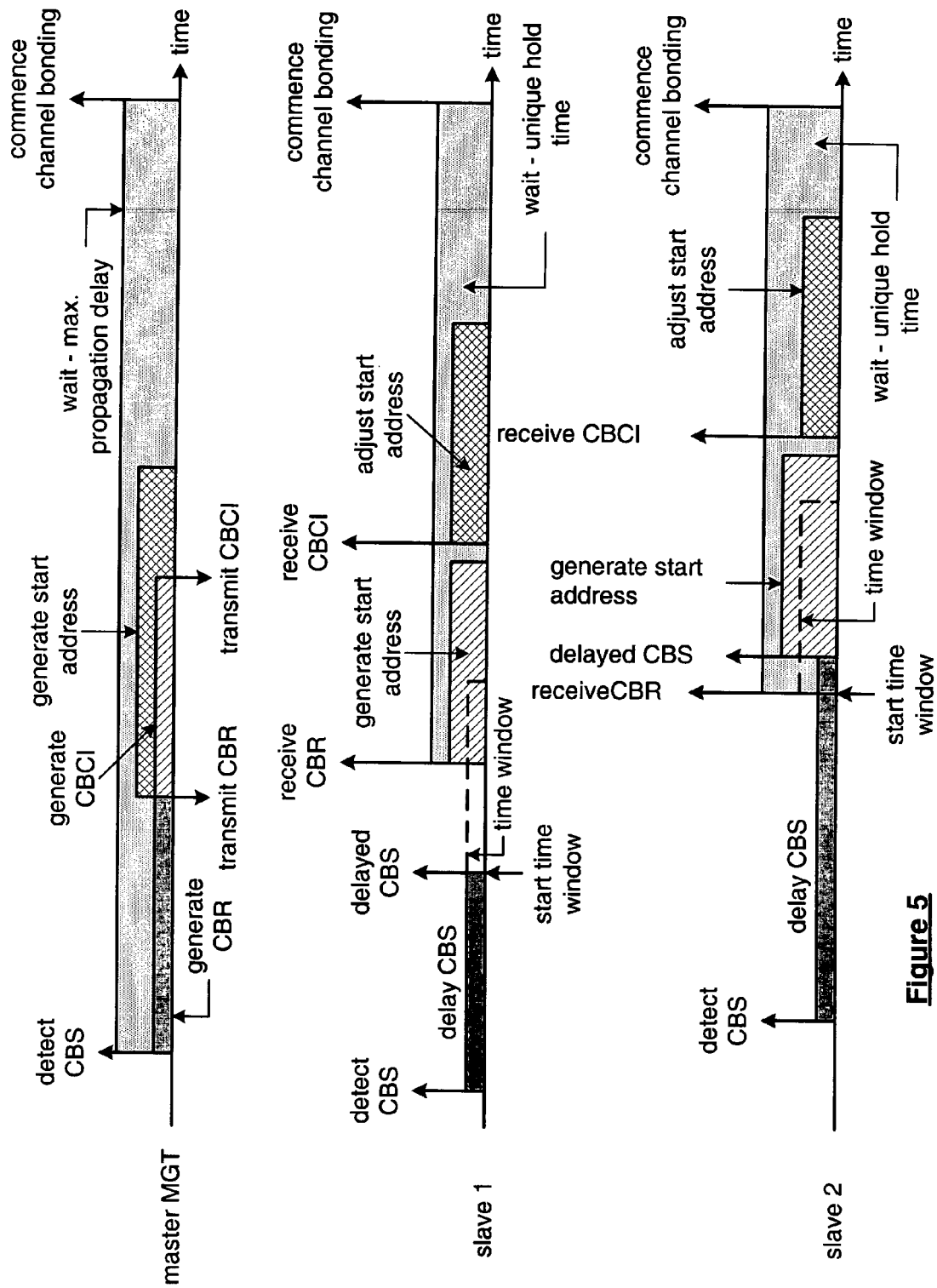
FIG. 5 is a timing diagram of the illustrative channel bonding of FIG. 4.

FIG. 5 is a timing diagram of the illustrative channel bonding of FIG. 4. In this illustrative example, the functioning of the master and the slaves of FIG. 4 to establish a channel bond are separately graphed in time. As shown, the master MGT detects the channel bonding sequence (CBS) at a given time, which triggers the master to generate the channel bonding request (CBR), to generate the channel bonding configuration information (CBCI), to determine a wait period based on the maximum propagation delay before commencing channel bonding, and to determine its channel bonding start address based on the wait period and the detection of the CBS.

As part of detecting the channel bonding sequence (CBS), the master determines the address of its buffer at which the CBS is stored to produce a CBS address. The master interprets the CBS to determine the number of slaves in the channel bond and to determine the channel bonding configuration. As will be discussed with reference to FIGS. 6 and 7, there are a variety of ways in which the slaves may be coupled to the master to accomplish channel bonding.

The master knows its processing time to prepare the channel bonding request (CBR), the propagation delays to transmit the CBR to each of the slaves, and the processing time of each slave to process the CBR, the channel bonding sequence, and the channel bonding configuration information to be ready for channel bonding commencement. The maximum propagation delay for the master thus includes it processing time to generate the CBR and the longest delay of the slaves to be ready for channel bonding. In this example, slave 2 has the longest delay. Note that there is some additional time added to the wait period for the master after slave 2 is ready to account for process variations, temperature variations, and/or to provide some tolerance.

The master also generates the channel bonding configuration information (CBCI) that is subsequently provided to the slaves. While this example illustrates the master generating the CBCI after completion of generating the channel bonding request (CBR), the master may generate the CBCI any time after it detects the channel bonding sequence (CBS).

The master then generates its channel bonding start address based it processing time of the CBR, the maximum propagation delay, its processing rate, and the CBS address. For example, if the CBS address is address 100, the memory includes a four byte data word line, a word line of data can be processed in 1 microsecond, its processing time of the CBR is 10 microseconds, and the maximum propagation delay is 25 microseconds, at total of 35 microseconds pass from the detection of the CBS until the system is ready for channel bonding. During those 35 microseconds, 35 word lines of data will be received, thus the write pointer to the buffer will advance 35 addresses from the CBS address. Thus, the channel bonding start address is 136 (e.g., 100+35+1), which is the next address in time.

The time line for slave 1 begins when it detects the channel bonding sequence (CBS). AS shown, slave 1 detects the CBS prior to the master detecting the CBS, which was also illustrated in FIG. 4. To account for the processing delays of the master in preparing the channel bonding request (CBR) and the propagation delays in receiving the CBR, slave 1 effectively delays the detection of the CBS for a specific period of time to produce a delayed CBS. Upon detecting the CBS, slave 1 begins to look for the CBR from the master or for the delayed CBS. In this example, since slave 1 is ahead of the master, the delayed CBS occurs, in time, before it receives the CBR. AS such, at the delayed CBS, slave 1 initiates a time window. The effective purpose of the time window is to insure that the channel bonding request that is being processed, is the same one the other slaves are processing. Accordingly, the duration of the time window depends on design constraints placed upon the IC as to how many slaves can be bonded and on data misalignment between the MGTs.

Slave 1 then waits to either receive the channel bonding request (CBR) or the expiration of the time window. If the time window expires before the CBR is received, a channel bonding error has occurred and a channel bond is not established. If, as in this example, the CBR is received during the time window, slave 1 begins to determine its channel bonding start address. Slave 1 further receives the channel bonding configuration information (CBCI) at some point in time. In this example, the CBCI is received subsequently to the receipt of the CBR, however, they may be received together or the CBCI may be received prior to receipt of the CBR. From this information, slave 1 adjusts its channel bonding start address and determines its unique hold time such that it may commence channel bonding in step with the master.

Slave 2 performs identical steps to prepare for channel bonding, but delayed in time since it receives the CBR and CBCI from slave 1, which has a propagation delay in forwarding the information. As shown in FIG. 4, slave 2 is lagging behind the master, thus, in FIG. 5, slave 2 detects the CBS after the master has detected its CBS. Slave 2 delays the CBS detect to produce a delayed CBS. In time, slave 2 receives the CBR before the delayed CBS. In this instance, slave 2 starts the time window upon receipt of the CBR and determines whether the delayed CBS occurs before expiration of the time window. In this example, it does, thus slave 2 continues to generate its channel bonding start address and unique hold time and is able commence channel bonding in step with the master.

Figure 6:
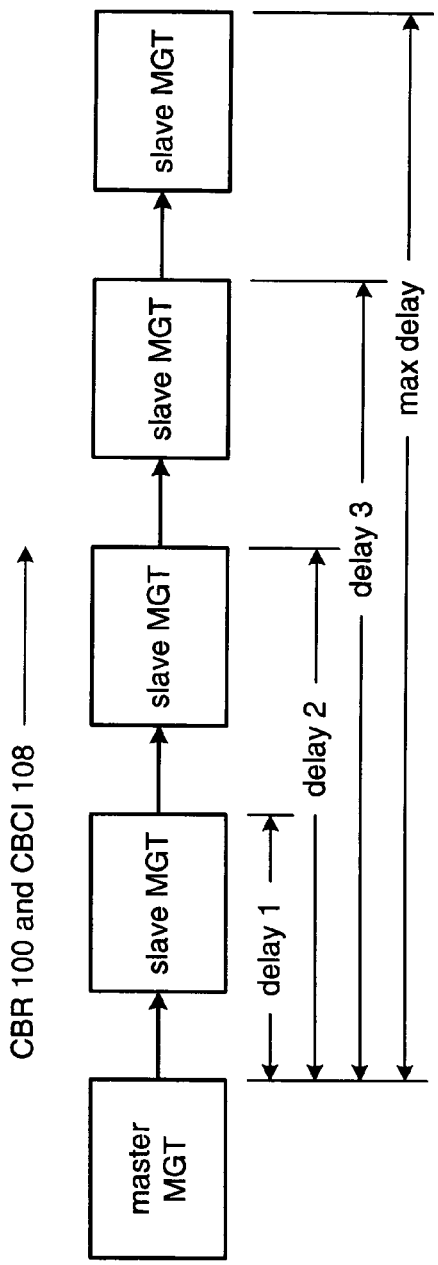
FIG. 6 is a schematic block diagram of one of a plurality of channel bonding configurations in accordance with the present invention.

FIG. 6 is a schematic block diagram of one of a plurality of channel bonding configurations in accordance with the present invention. In this illustration the slaves are daisy chain coupled to the master. The master provides the channel bonding request (CBR) 100 and the channel bonding configuration information (CBCI) 108 to the first slave in the chain. Delay 1 corresponds to the time it takes for the first slave to have its channel bonding address completely generated.

The first slave provides the CBR 100 and CBCI 108 to the second slave, which, in turn, provides the CBR and CBCI to the third slave and so on. In this illustration, there are four slaves coupled to the master. Thus, the time it takes the fourth slave to completely generate its channel bonding start address is the maximum delay, which is used by the master and the other slaves to determine the channel bonding commencement.

Figure 7:
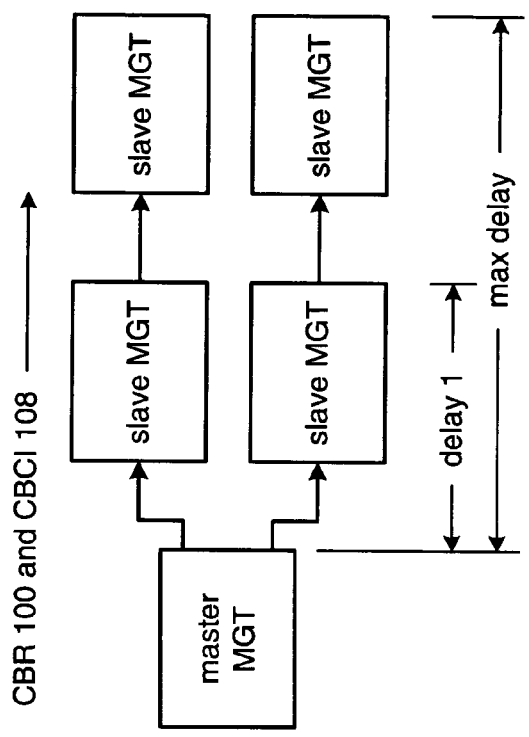
FIG. 7 is a schematic block diagram of another one of the plurality of channel bonding configurations in accordance with the present invention.

FIG. 7 is a schematic block diagram of another one of the plurality of channel bonding configurations in accordance with the present invention. In this example, the master is coupled to two slaves, which are each coupled to another slave. In this illustration, the maximum delay is less than in the example of FIG. 6, since there are fewer slaves in series. Note that the channel bonding configuration information 108 is uniquely generated for each channel bonding configuration.

As one of average skill in the art will appreciate, there are numerous ways in which the master may be coupled to the slaves for channel bonding. Further, by accounting for the processing and propagation delays of the transceivers, any number of transceivers may be bonded together without encounter the latency issues of the past.

Figure 8:
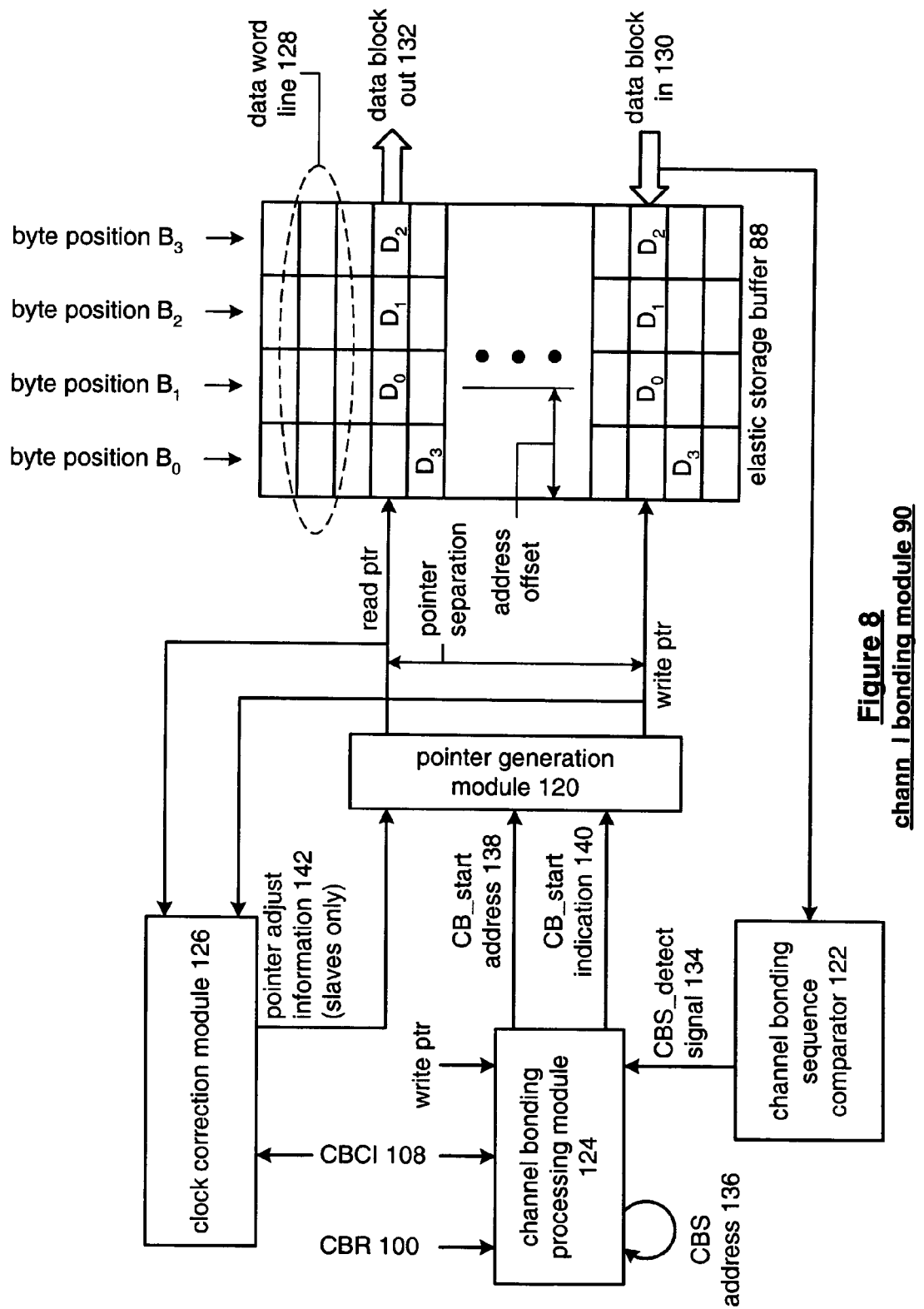
FIG. 8 is a schematic block diagram of a channel bonding module in accordance with the present invention.

FIG. 8 is a schematic block diagram of a channel bonding module 90 operably coupled to the elastic storage buffer 88. In this embodiment, the channel bonding module 90 includes a pointer generation module 120, a channel bonding sequence comparator 122, a channel bonding processing module 124, and a clock correction module 126. In general, the function of the channel bonding module 90, whether in slave mode or master mode, is to read data from and write data to its corresponding buffer at the same time and with the same byte positioning as every other channel bonding module 90 in a channel bond. Each of the modules of the channel bonding module 90 may be separate processing devices or contained in one processing device with multiple functions. The processing module may have an associated memory to store the corresponding operational instructions of the functions performed by the processing device. Such a processing device includes, but is not limited to, microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

In the example of FIG. 8, which corresponds to the example of FIG. 4, the byte positioning of the data is shifted by one byte. Thus, a single data block 130 or 132 is stored on two data word lines 128 of the buffer 88. For instance, byte D0 is stored at byte position B1 of a particular data word line 128 of the buffer 88; byte D1 is stored at byte position B2 of the same data word line; and byte D2 is stored at byte position B3 of the same data word line. Byte D4 of the data is stored at byte position B0 of a subsequent data word line of buffer 88. However, the data block 130 is written to the buffer as if its stored in the same data word line. Similarly, the data block 132 is read from the memory as if it is stored on one data word line. The channel bonding module 90 provides the memory manipulation to accommodate the reading from and writing to of data in this manner.

The channel bonding sequence comparator 122 compares bytes of data as it is written into the buffer 88 with a channel bonding sequence. When four bytes, regardless of their byte position in the buffer 88, correspond to the channel bonding sequence, the channel bonding sequence comparator 122 generates a channel bonding sequence detect signal 134. This is done in the same manner whether the channel bonding module is in the slave mode or in the master mode.

In the master mode, the channel bonding processing module 124, generates a channel bonding sequence (CBS) address 136 based on the CBS_detect signal 134 and the write pointer (write ptr). Typically, whatever address the write pointer is pointing to at the time the CBS_detect signal 134 is activated will be the CBS address 136. The channel bonding processing module 124 also generates the channel bonding request (CBR) 100 and the channel bonding configuration information (CBCI) 108 in response to the CBS.

The channel bonding processing module 124 generates the CBCI 108 to include a number of slave transceivers, propagation delays of each of the slave transceivers with respect to the master transceiver transmitting the channel bonding request, and clock correction information. The channel bonding processing module 124 generates the clock correction information by generating pointer separation information (i.e., the difference between its read pointer and its write pointer), generating an address offset (i.e., its byte positioning of when the first byte of the channel bonding sequence), and generating an adjust enable signal.

The channel bonding processing module 124 also generates its channel bonding start address 138 and its channel bonding start indication 140 as was discussed with reference to FIGS. 4 and 5. The pointer module 120 generates the read and write pointers for accessing the buffer 88 in accordance with the start address 138.

In the master mode, the clock correction module 126 is idle. In the slave mode, the clock correction module 126 generates pointer adjust information 142 based on the channel bonding configuration information 108 (in particular, the pointer separation, the address offset, and may further include processing rate of the master), the write pointer and the read pointer. Based on the pointer adjust information 142 and in accordance with the adjust enable signal, the pointer generation module 120 adjusts the read pointer and write pointer to be byte aligned and synchronous with the read and write pointers of the master, even through they may be pointing to different addresses. In other words, the pointer adjust information 142 enables the pointer generation module 120 to insure that the read and write pointers of a slave have the same address offset and pointer separation as the master and that these parameters are maintained.

In the slave mode, the channel bonding processing module 124 generates the channel bonding start address 136 and the channel bonding start indication 140 based on the CBS detect signal 134, the CBR 100, the CBCI 108, and the write pointer. In this mode, the channel bonding processing module 124 receives the CBR 100 and the CBCI 108 from the master or another slave.

Another embodiment of the channel bonding module 90 includes a processing module and memory. The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory stores, and the processing module executes, operational instructions corresponding to at least some of the steps and/or functions illustrated in FIGS. 9-11.

Figure 9:
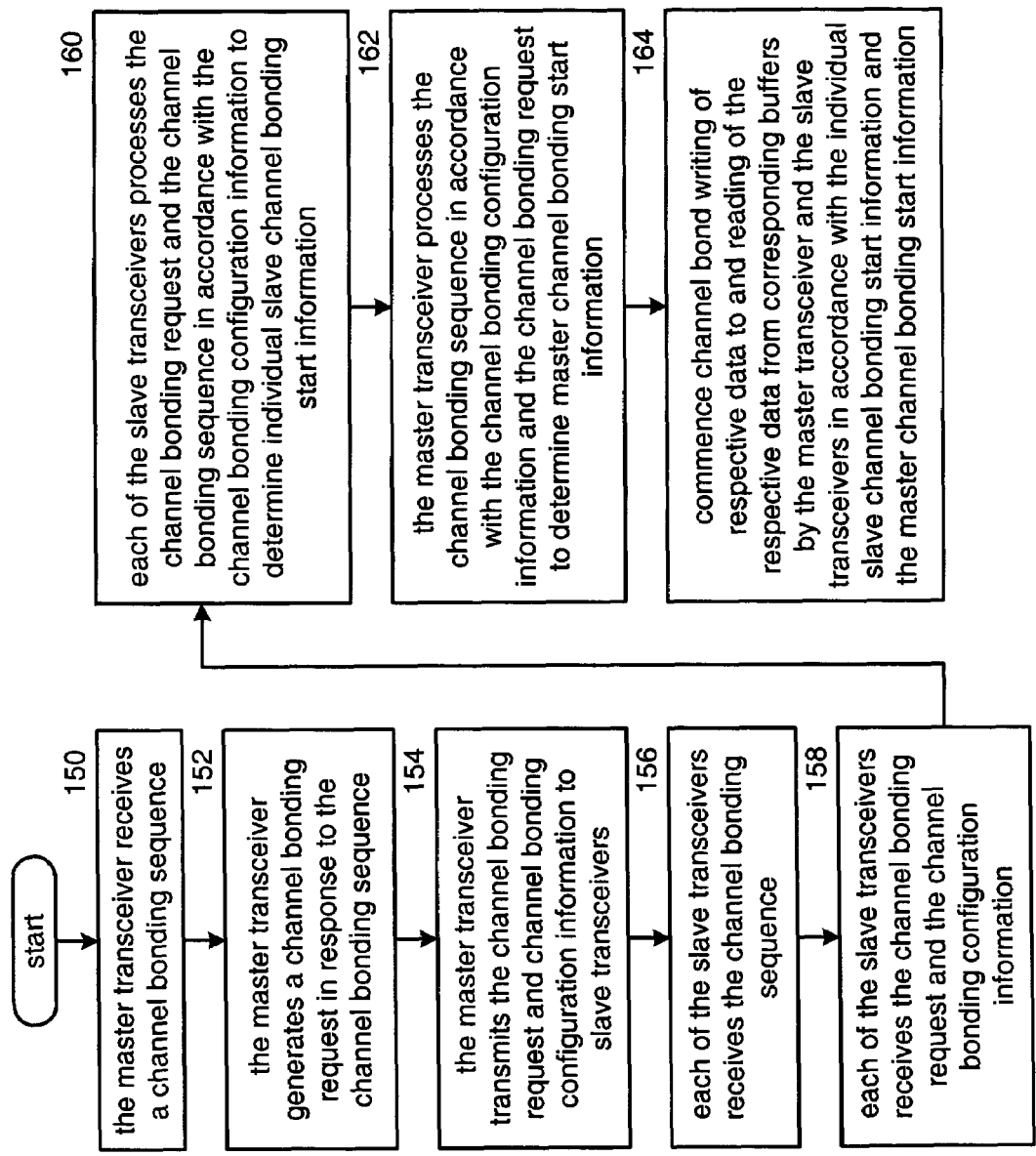
FIG. 9 is a logic diagram of a method for channel bonding a plurality of multi-gigabit transceivers in accordance with the present invention.

FIG. 9 is a logic diagram of a method for channel bonding a plurality of multi-gigabit transceivers that begins at step 150 where the master transceiver of the plurality of multi-gigabit transceivers receives a channel bonding sequence. In one embodiment, the channel bonding sequence is received within incoming data and subsequently detected. The process then proceeds to step 152 where the master transceiver generates a channel bonding request in response to the channel bonding sequence. The process then proceeds to step 154 where the master transceiver transmits the channel bonding request and channel bonding configuration information to the slave transceivers.

The channel bonding configuration information includes a number of slave transceivers, propagation delays of each of the slave transceivers with respect to the master transceiver transmitting the channel bonding request, and clock correction information. The clock correction information includes pointer separation information, an address offset, and an adjust enable signal. The pointer separation may be generated by determining a read pointer of the master transceiver when the channel bonding sequence is received to produce a master read pointer, determining a write pointer of the master transceiver when the channel bonding sequence is received to produce a master write pointer, and determining the pointer separation as a difference between the master read pointer and the master write pointer. The address offset may be generated by determining byte positioning of the channel bonding sequence with respect to a word line of memory of the master transceiver, and establishing the address offset based on the byte positioning.

The process then proceeds to step 156 where each of the slave transceivers receives the channel bonding sequence, which may be contained within incoming data. The process then proceeds to step 158 where each of the slave transceivers receives the channel bonding request and the channel bonding configuration information. The process then proceeds to step 160 where each of the slave transceivers processes the channel bonding request and the channel bonding sequence in accordance with the channel bonding configuration information to determine individual slave channel bonding start information. The processing of step 160 will be described in greater detail with reference to FIG. 10.

The processing of FIG. 9 continues at step 162 where the master transceiver processes the channel bonding sequence in accordance with the channel bonding configuration information and the channel bonding request to determine master channel bonding start information. In one embodiment this may be done by storing an address at which the channel bonding sequence was received to produce a channel bonding sequence address, and determining a channel bonding write start address based on the channel bonding sequence address and maximum propagation delay of the channel bonding configuration information.

The process then proceeds to step 164 where channel bond writing of respective data to and reading of the respective data from corresponding buffers by the master transceiver and the slave transceivers commences in accordance with the individual slave channel bonding start information and the master channel bonding start information.

Figure 10:
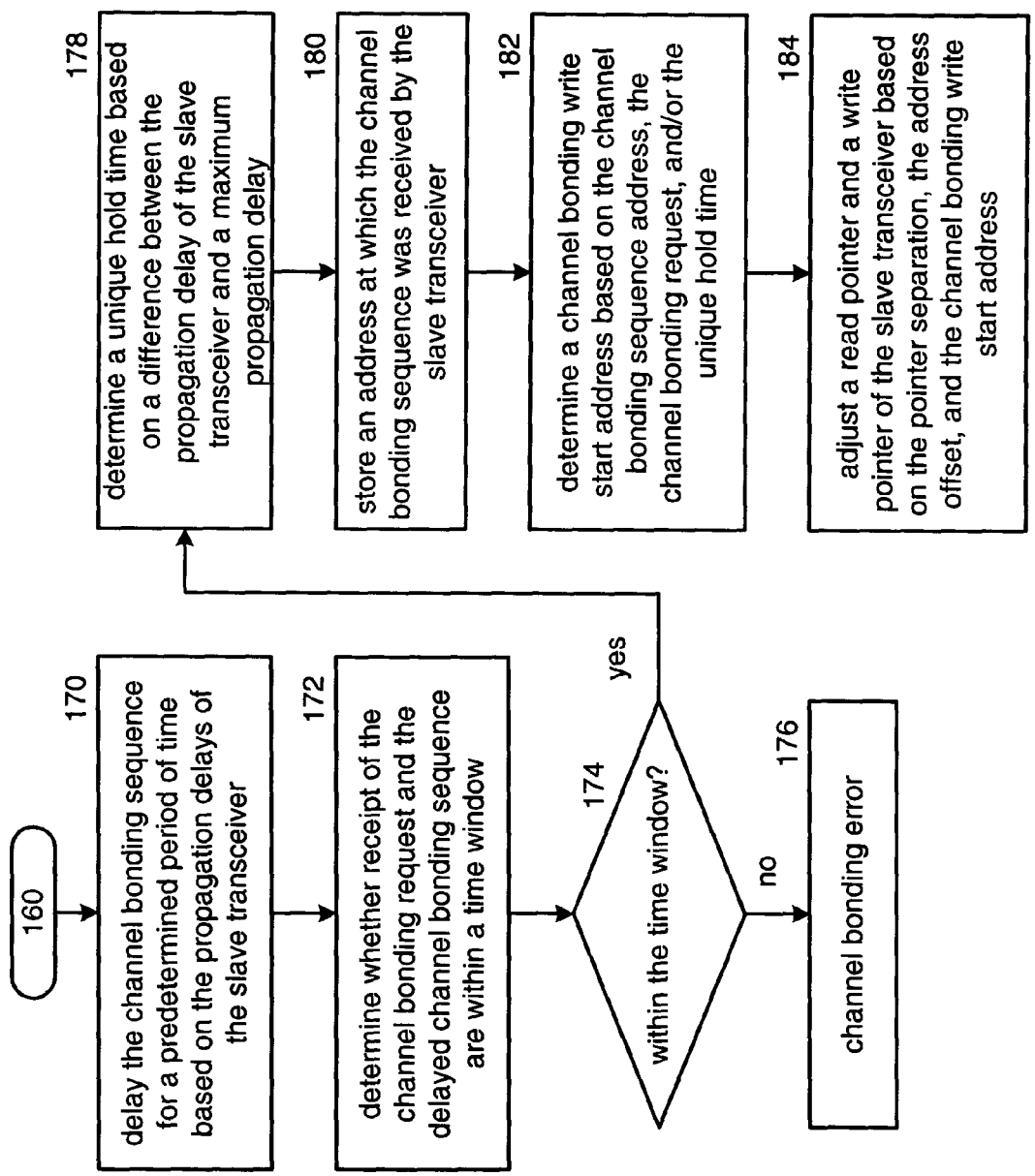
FIG. 10 is a logic diagram of the slave processing of the logic diagram of FIG. 9.

FIG. 10 is a logic diagram of the slave processing at step 160 of the logic diagram of FIG. 9. The processing begins at step 170 where the channel bonding sequence is delayed for a predetermined period of time based on the propagation delays of a corresponding one of the slave transceivers to produce a delayed channel bonding sequence. The process then proceeds to step 172 where a determination is made as to whether receipt of the channel bonding request and the delayed channel bonding sequence are within a time window. Such a determination may be made by initiating the time window when one of the delay channel bonding sequence or the channel bonding request is received, and determining whether the other one of the delay channel bonding sequence or the channel bonding request is received prior to expiration of the time window.

The process then proceeds to step 174, where the process branches to step 178 when the receipt of the channel bonding request and the delayed channel bonding sequence are within the time window and to step 176 when they are not. At step 176, a channel bonding error is generated. At step 178, a unique hold time is determined based on a difference between the propagation delay of the corresponding one of the slave transceivers and a maximum propagation delay. The process then proceeds to step 180 where an address at which the channel bonding sequence was received by the corresponding one of the slave transceivers is stored to produce a channel bonding sequence address. The process then proceeds to step 182 where a channel bonding write start address is determined based on at least one of: the channel bonding sequence address, the channel bonding request, and the unique hold time. The process then proceeds to step 184 where a read pointer and a write pointer of the corresponding one of the slave transceivers are adjusted based on the pointer separation, the address offset, and the channel bonding write start address.

Figure 11:
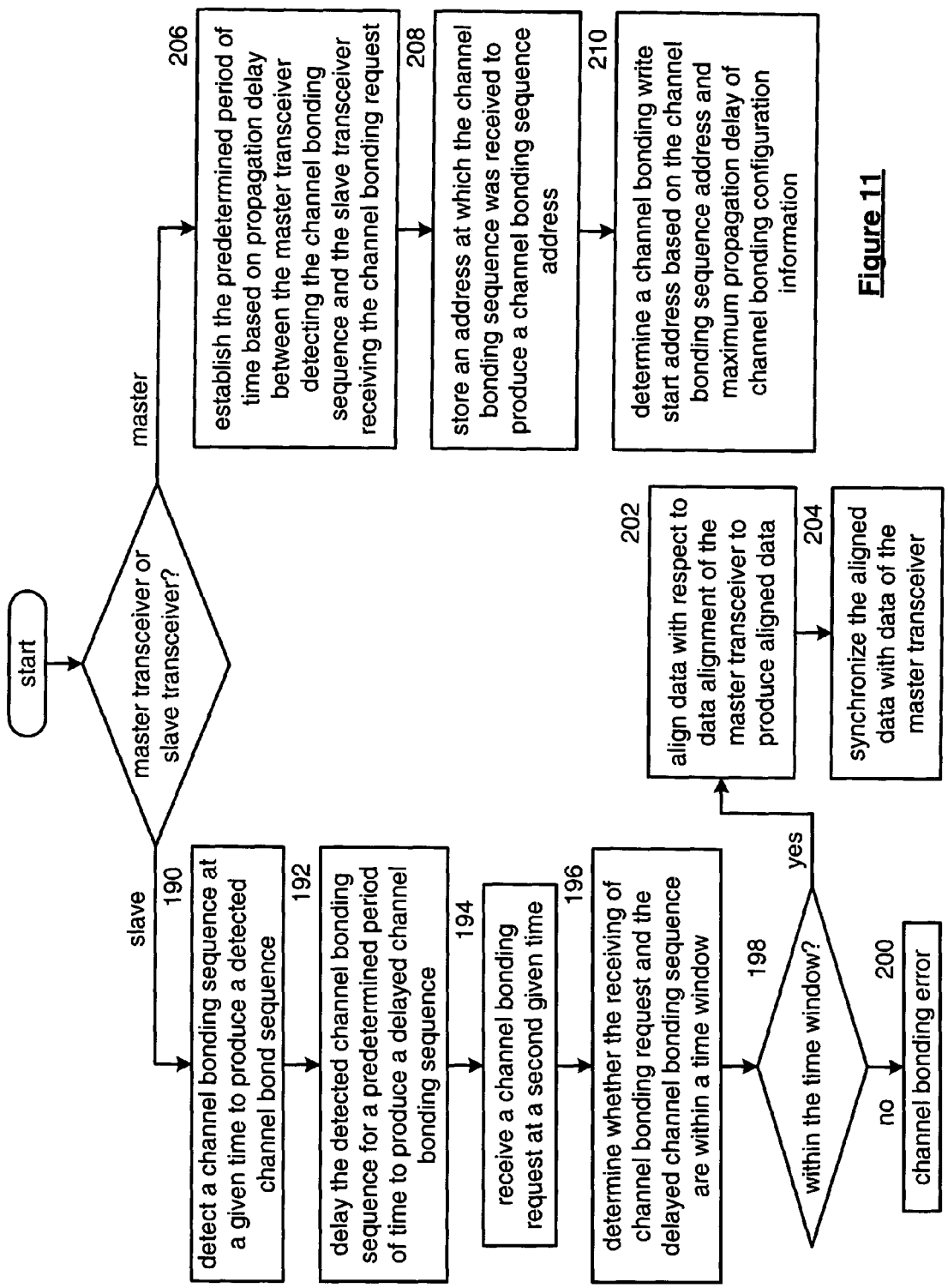
FIG. 11 is a logic diagram of a method for channel bonding by a multi-gigabit transceiver in accordance with the present invention.

FIG. 11 is a logic diagram of a method for channel bonding by a multi-gigabit transceiver that begins at step 190 where a determination is made as to whether the multi-gigabit transceiver is a master transceiver or a slave transceiver. When the multi-gigabit transceiver is the slave transceiver to process proceeds to step 190 where a channel bonding sequence is detected at a given time to produce a detected channel bond sequence. The process then proceeds to step 192 where the detected channel bonding sequence is delayed for a predetermined period of time to produce a delayed channel bonding sequence. The process then proceeds to step 194 where a channel bonding request is received at a second given time.

The process then proceeds to steps 196 and 198 where a determination is made as to whether the receiving of channel bonding request and the delayed channel bonding sequence are within a time window. This may be done by first determining whether the delayed channel bonding sequence occurs, in time, before the receiving of the channel bonding request. When the delayed channel bonding sequence occurs before the receiving of the channel bonding request, the determination continues by initiating a first clock cycle count from the delay channel bonding sequence to establish the time window and determining whether the channel bonding request is received before expiration of the first clock cycle count. When the channel bonding request is received before expiration of the first clock cycle count, the determination continues by determining that the receiving of channel bonding request and the delayed channel bonding sequence are within the time window. When the delayed channel bonding sequence occurs after the receiving of the channel bonding request, the determination continues by initiating a second clock cycle count from the receiving of the channel bonding request to establish the time window, and determining whether the delayed channel bonding sequence occurs before expiration of the second clock cycle count. When the delayed channel bonding sequence occurs before expiration of the second clock cycle count, the determination continues by determining that the receiving of channel bonding request and the delayed channel bonding sequence are within the time window. When the delayed channel bonding sequence occurs at substantially the same time as the receiving of the channel bonding request, the determination continues by determining that the receiving of channel bonding request and the delayed channel bonding sequence are within the time window.

If the channel bonding request and the delayed channel bonding sequence are not within the time window as determined in step 198, the process proceeds to step 200 where a channel bonding error is generate. If the receiving of channel bonding request and the delayed channel bonding sequence are within the time window, the process proceeds to step 202 where data is aligned with respect to data alignment of the master transceiver to produce aligned data. The process the proceeds to step 204 where the aligned data is synchronized with data of the master transceiver.

If the transceiver is a master, the process proceeds to step 206 where the predetermined period of time is established based on propagation delay between the master transceiver detecting the channel bonding sequence and the slave transceiver receiving the channel bonding request. The process then proceeds to step 208 where an address at which the channel bonding sequence was received is stored to produce a channel bonding sequence address. The process then proceeds to step 210 where a channel bonding write start address is determined based on the channel bonding sequence address and maximum propagation delay of channel bonding configuration information.

As one of average skill in the art will appreciate, the term "substantially", as may be used herein, provides an industry-accepted tolerance to its corresponding term. Such an industry-accepted tolerance may range, for example, from less than one percent to twenty percent and may correspond to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled".

The preceding discussion has present a variety of embodiments for channel bonding a plurality of multi-gigabit transceivers. Such channel bonding is applicable to any integrated circuit that includes a plurality of high-speed interfaces and may be used with data word lines of more or less than four bytes. As one of average skill in the art will appreciate, other embodiments may be derived from the teachings of the present invention without deviating from the scope of the claims.

What is claimed is:

1. A method of channel bonding a plurality of multi-gigabit transceivers, the method comprises:

receiving, by a master transceiver of the plurality of multi-gigabit transceivers, a channel bonding sequence;

generating, by the master transceiver, a channel bonding request in response to the channel bonding sequence;

transmitting, by the master transceiver, the channel bonding request and a channel bonding configuration information to slave transceivers of the plurality of multi-gigabit transceivers;

receiving, by each of the slave transceivers, the channel bonding sequence;

receiving, by each of the slave transceivers, the channel bonding request and the channel bonding configuration information;

processing, by each of the slave transceivers, the channel bonding request and the channel bonding sequence in accordance with the channel bonding configuration information to determine individual slave channel bonding start information;

processing, by the master transceiver, the channel bonding sequence in accordance with the channel bonding configuration information and the channel bonding request to determine master channel bonding start information; and commencing channel bond writing of respective data to and reading of the respective data from corresponding buffers by the master transceiver and the slave transceivers in accordance with the individual slave channel bonding start information and the master channel bonding start information.

2. The method of claim 1, wherein the receiving the channel bonding sequence by the master transceiver further comprises:

receiving the channel bonding sequence within incoming data; and detecting the channel bonding sequence within the incoming data.

3. The method of claim 1 further comprises:

designating one of the plurality of multi-gigabit transceivers as the master transceiver; and designating at least some of remaining ones of the plurality of multi-gigabit transceivers as the slave transceivers.

4. The method of claim 1, wherein the receiving the channel bonding sequence by each of the slave transceivers further comprises:

receiving the channel bonding sequence within incoming data; and detecting the channel bonding sequence within the incoming data.

5. The method of claim 1, wherein the receiving, by each of the slave transceivers, the channel bonding request and the channel bonding configuration information further comprises:

receiving the channel bonding request and the channel bonding configuration information from the master transceiver; or receiving the channel bonding request and the channel bonding configuration information from at least one intervening slave transceiver.

6. The method of claim 1 further comprises the master transceiver generating the channel bonding configuration information further to include:

a number of slave transceivers;

propagation delays of each of the slave transceivers with respect to the master transceiver transmitting the channel bonding request; and clock correction information.

7. The method of claim 6, wherein the generating the clock correction information comprises:

generating pointer separation information;

generating an address offset; and generating an adjust enable signal.

8. The method of claim 7, wherein the generating the pointer separation comprises:

determining a read pointer of the master transceiver when the channel bonding sequence is received to produce a master read pointer;

determining a write pointer of the master transceiver when the channel bonding sequence is received to produce a master write pointer; and determining the pointer separation as a difference between the master read pointer and the master write pointer.

9. The method of claim 7, wherein the generating the address offset comprises:

determining byte positioning of the channel bonding sequence with respect to a word line of memory of the master transceiver; and establishing the address offset based on the byte positioning.

10. The method of claim 7, wherein the processing, by each of the slave transceivers, the channel bonding request and the channel bonding sequence in accordance with the channel bonding configuration information to determine individual slave channel bonding start information comprises:

delaying the channel bonding sequence for a predetermined period of time based on the propagation delays of a corresponding one of the slave transceivers to produce a delayed channel bonding sequence;

determining whether receipt of the channel bonding request and the delayed channel bonding sequence are within a time window;

when the receipt of the channel bonding request and the delayed channel bonding sequence are within the time window:

determining a unique hold time based on a difference between the propagation delay of the corresponding one of the slave transceivers and a maximum propagation delay;

storing an address at which the channel bonding sequence was received by the corresponding one of the slave transceivers to produce a channel bonding sequence address;

determining a channel bonding write start address based on at least one of: the channel bonding sequence address, the channel bonding request, and the unique hold time; and adjusting a read pointer and a write pointer of the corresponding one of the slave transceivers based on the pointer separation, the address offset, and the channel bonding write start address.

11. The method of claim 10, wherein the determining whether receipt of the channel bonding request and the delayed channel bonding sequence are within the time window comprises:

when one of the delay channel bonding sequence or the channel bonding request is received, initiating the time window; and determining whether the other one of the delay channel bonding sequence or the channel bonding request is received prior to expiration of the time window.

12. The method of claim 10, wherein the adjusting the read pointer and the write pointer further comprises:

adding the address offset to the read pointer and to the write pointer.

13. The method of claim 1, wherein the processing of the channel bonding sequence in accordance with the channel bonding configuration information and the channel bonding request to determine master channel bonding start information comprises:

storing an address at which the channel bonding sequence was received to produce a channel bonding sequence address; and determining a channel bonding write start address based on the channel bonding sequence address and maximum propagation delay of the channel bonding configuration information.

14. A method for channel bonding by a multi-gigabit transceiver, the method comprises:
   determining whether the multi-gigabit transceiver is a master transceiver or a slave transceiver;
   when the multi-gigabit transceiver is the slave transceiver:
      detecting a channel bonding sequence at a given time to produce a detected channel bond sequence;
      delaying the detected channel bonding sequence for a predetermined period of time to produce a delayed channel bonding sequence;
      receiving a channel bonding request at a second given time;
      determining whether the receiving of channel bonding request and the delayed channel bonding sequence are within a time window;
      when the receiving of channel bonding request and the delayed channel bonding sequence are within the time window:
         aligning data with respect to data alignment of the master transceiver to produce aligned data; and
         synchronizing the aligned data with data of the master transceiver.

15. The method of claim 14, wherein the determining whether the receiving of channel bonding request and the delayed channel bonding sequence are within the time window comprises:
   determining whether the delayed channel bonding sequence occurs, in time, before the receiving of the channel bonding request;
   when the delayed channel bonding sequence occurs before the receiving of the channel bonding request:
      initiating a first clock cycle count from the delay channel bonding sequence to establish the time window;
      determining whether the channel bonding request is received before expiration of the first clock cycle count; and
      when the channel bonding request is received before expiration of the first clock cycle count, determining that the receiving of channel bonding request and the delayed channel bonding sequence are within the time window;
   when the delayed channel bonding sequence occurs after the receiving of the channel bonding request:
      initiating a second clock cycle count from the receiving of the channel bonding request to establish the time window;
      determining whether the delayed channel bonding sequence occurs before expiration of the second clock cycle count; and
      when the delayed channel bonding sequence occurs before expiration of the second clock cycle count, determining that the receiving of channel bonding request and the delayed channel bonding sequence are within the time window; and
   when the delayed channel bonding sequence occurs at substantially the same time as the receiving of the channel bonding request, determining that the receiving of channel bonding request and the delayed channel bonding sequence are within the time window.

16. The method of claim 14, wherein the aligning data with respect to data alignment of the master transceiver to produce aligned data comprises:
   determining a unique hold time based on a difference between propagation delay of the master transceiver detecting the channel bonding sequence and the slave transceiver receiving the channel bonding request and a maximum propagation delay;
   storing an address at which the channel bonding sequence was received by the slave transceiver to produce a channel bonding sequence address; and
   determining a channel bonding write start address based on at least one of: the channel bonding sequence address, the channel bonding request, and the unique hold time.

17. The method of claim 16, wherein the synchronizing the aligned data comprises:
   adjusting a read pointer and a write pointer of the slave transceiver based on pointer separation, an address offset, and the channel bonding write start address, wherein the pointer separation corresponds to a difference between a master read pointer and a master write pointer of the master transceiver and wherein the address offset corresponds to byte positioning of the channel bonding sequence with respect to a word line of memory of the master transceiver.

18. The method of claim 14 further comprises, when the multi-gigabit transceiver is the master transceiver:
   establishing the predetermined period of time based on propagation delay between the master transceiver detecting the channel bonding sequence and the slave transceiver receiving the channel bonding request.

19. The method of claim 18 further comprises:
   storing an address at which the channel bonding sequence was received to produce a channel bonding sequence address; and
   determining a channel bonding write start address based on the channel bonding sequence address and maximum propagation delay of channel bonding configuration information.

20. A channel bonding module for a multi-gigabit transceiver, the channel bonding module comprises:
   channel bonding sequence comparator operably coupled to a buffer of the multi-gigabit transceiver, wherein the buffer temporarily stores received data, and wherein the channel bonding sequence comparator compares data blocks of the received data with a channel bonding sequence and, when a current data block of the data blocks of the received data substantially matches the channel bonding sequence, the channel bonding sequence comparator generates a channel bonding sequence detect signal;
   pointer generation module operably coupled to generate a read pointer and a write pointer for the buffer; and
   channel bonding processing module operably coupled to:
      generate a channel bonding sequence address based on the write pointer and the channel bonding sequence detect signal;
      generate a channel bonding start address based on the channel bonding sequence address and channel bonding configuration information;
      generate a channel bonding start indication based on the channel bonding configuration information;
      provide the channel bonding start address and the channel bonding start indication to the pointer generation module such that, at commencement of channel bonding, the write pointer corresponds to the channel bonding start address.

21. The channel bonding module of claim 20 further comprises:
   a clock correction module operably coupled to:

generate pointer adjust information based on clock correction information, the read pointer, and the write pointer, wherein the clock correction information includes pointer separation information, an address offset, and an adjust enable signal; and provide the pointer adjust information to the pointer generation module, wherein the pointer generation module adjusts the read pointer and write pointer prior to the commencement of the channel bonding.

22. The channel bonding module of claim 21 further comprises:

a master/slave module operably coupled to indicate whether the multi-gigabit transceiver is a master transceiver or a slave transceiver.

23. The channel bonding module of claim 22, wherein the channel bonding processing module further functions to:

when the multi-gigabit transceiver is the master transceiver:

generate a channel bonding request in response to the channel bonding sequence detect signal;

provide the channel bonding request to slave transceivers;

generate the channel bonding configuration information to indicate a number of the slave transceivers, propagation delays of each of the slave transceivers with respect to the master transceiver transmitting the channel bonding request, and a maximum propagation delay;

when the multi-gigabit transceiver is the slave transceiver:

process the channel bonding request in accordance with the channel bonding sequence address and the write pointer to generate the channel bonding start address; and process the propagation delay of the propagation delays for the slave transceiver and the maximum propagation delay to determine the channel bonding start indication.

24. The channel bonding module of claim 23, wherein, when the multi-gigabit transceiver is the slave transceiver, the channel bonding processing module further functions to process the channel bonding request in accordance with the channel bonding sequence address and the write pointer to generate the channel bonding start address by:

storing the channel bonding sequence detect signal for a predetermined period of time based on the propagation delays of a corresponding one of the slave transceivers to produce a delayed channel bonding sequence detect;

determining whether receipt of the channel bonding request and the delayed channel bonding sequence detect are within a time window;

when the receipt of the channel bonding request and the delayed channel bonding sequence detect are within the time window, generating the channel bonding start address in accordance; and when the receipt of the channel bonding request and the delayed channel bonding sequence detect are not within the time window, generating an channel bonding error indication.

25. The channel bonding module of claim 24, wherein the determining whether receipt of the channel bonding request and the delayed channel bonding sequence are within the time window comprises:

when one of the delay channel bonding sequence detect or the channel bonding request is received, initiating the time window; and determining whether the other one of the delay channel bonding sequence detect or the channel bonding request is received prior to expiration of the time window.

26. The channel bonding module of claim 22, wherein the clock correction module further functions to:

when the multi-gigabit transceiver is the master transceiver:

generate the clock correction information to include pointer separation information, an address offset, and an adjust enable signal, wherein the generating the pointer separation includes:

determining a read pointer of the master transceiver when the channel bonding sequence is received to produce a master read pointer;

determining a write pointer of the master transceiver when the channel bonding sequence is received to produce a master write pointer; and determining the pointer separation as a difference between the master read pointer and the master write pointer, and wherein the generating the address offset includes:

determining byte positioning of the channel bonding sequence with respect to a word line of the buffer of the master transceiver; and establishing the address offset based on the byte positioning.

27. The channel bonding module of claim 26, wherein the clock correction module further functions to:

when the multi-gigabit transceiver is the slave transceiver:

adjust a read pointer and a write pointer that correspond to the channel bonding start address based on the pointer separation and the address offset.

28. An integrated circuit comprises:

a plurality of multi-gigabit transceivers, wherein one of the plurality of multi-gigabit transceivers is designated as a master transceiver and remaining ones of the plurality of multi-gigabit transceivers are designated as slave transceivers;

the master transceiver is operably coupled to:

receive a channel bonding sequence;

generate a channel bonding request in response to the channel bonding sequence;

transmit the channel bonding request and channel bonding configuration information to the slave transceivers;

process the channel bonding sequence in accordance with the channel bonding configuration information and the channel bonding request to determine master channel bonding start information;

commence channel bond writing of respective data to and reading of the respective data from corresponding buffers by the master transceiver in accordance with the master channel bonding start information;

each of the slave transceivers operably coupled to:

receive the channel bonding sequence;

receive the channel bonding request and the channel bonding configuration information;

process the channel bonding request and the channel bonding sequence in accordance with the channel bonding configuration information to determine individual slave channel bonding start information; and commence the channel bond writing of respective data to and reading of the respective data from corresponding buffers by the slave transceivers in accordance with the individual slave channel bonding start information.

29. The integrated circuit of claim 28, wherein the receiving the channel bonding sequence by the master transceiver further comprises:
  receiving the channel bonding sequence within incoming data; and
  detecting the channel bonding sequence within the incoming data.

30. The integrated circuit of claim 28, wherein the receiving the channel bonding sequence by each of the slave transceivers further comprises:
  receiving the channel bonding sequence within incoming data; and
  detecting the channel bonding sequence within the incoming data.

31. The integrated circuit of claim 28, wherein the receiving, by each of the slave transceivers, the channel bonding request and the channel bonding configuration information further comprises:
  receiving the channel bonding request and the channel bonding configuration information from the master transceiver; or
  receiving the channel bonding request and the channel bonding configuration information from at least one intervening slave transceiver.

32. The integrated circuit of claim 28 further comprises the master transceiver generating the channel bonding configuration information further to include:
  a number of slave transceivers;
  propagation delays of each of the slave transceivers with respect to the master transceiver transmitting the channel bonding request; and
  clock correction information.

33. The integrated circuit of claim 32, wherein the generating the clock correction information comprises:
  generating pointer separation information;
  generating an address offset; and
  generating an adjust enable signal.

34. The integrated circuit of claim 33, wherein the generating the pointer separation comprises:
  determining a read pointer of the master transceiver when the channel bonding sequence is received to produce a master read pointer;
  determining a write pointer of the master transceiver when the channel bonding sequence is received to produce a master write pointer; and
  determining the pointer separation as a difference between the master read pointer and the master write pointer.

35. The integrated circuit of claim 33, wherein the generating the address offset comprises:
  determining byte positioning of the channel bonding sequence with respect to a word line of memory of the master transceiver; and
  establishing the address offset based on the byte positioning.

36. The integrated circuit of claim 33, wherein the processing, by each of the slave transceivers, the channel bonding request and the channel bonding sequence in accordance with the channel bonding configuration information to determine individual slave channel bonding start information comprises:
  delaying the channel bonding sequence for a predetermined period of time based on the propagation delays of a corresponding one of the slave transceivers to produce a delayed channel bonding sequence;
  determining whether receipt of the channel bonding request and the delayed channel bonding sequence are within a time window;
  when the receipt of the channel bonding request and the delayed channel bonding sequence are within the time window:
    determining a unique hold time based on a difference between the propagation delay of the corresponding one of the slave transceivers and a maximum propagation delay;
    storing an address at which the channel bonding sequence was received by the corresponding one of the slave transceivers to produce a channel bonding sequence address;
    determining a channel bonding write start address based on at least one of: the channel bonding sequence address, the channel bonding request, and the unique hold time; and
    adjusting a read pointer and a write pointer of the corresponding one of the slave transceivers based on the pointer separation, the address offset, and the channel bonding write start address.

37. The integrated circuit of claim 36, wherein the determining whether receipt of the channel bonding request and the delayed channel bonding sequence are within the time window comprises:
  when one of the delay channel bonding sequence or the channel bonding request is received, initiating the time window; and
  determining whether the other one of the delay channel bonding sequence or the channel bonding request is received prior to expiration of the time window.

38. The integrated circuit of claim 36, wherein the adjusting the read pointer and the write pointer further comprises:
  adding the address offset to the read pointer and to the write pointer.

39. The integrated circuit of claim 28, wherein the processing of the channel bonding sequence in accordance with the channel bonding configuration information and the channel bonding request to determine master channel bonding start information comprises:
  storing an address at which the channel bonding sequence was received to produce a channel bonding sequence address; and
  determining a channel bonding write start address based on the channel bonding sequence address and maximum propagation delay of the channel bonding configuration information.

40. A multi-gigabit transceiver comprises:
processing module; and
memory operably coupled to the processing module, wherein the memory stores operational instructions that cause the processing module to:
  determine whether the multi-gigabit transceiver is a master transceiver or a slave transceiver;
  when the multi-gigabit transceiver is the slave transceiver:
    detect a channel bonding sequence at a given time to produce a detected channel bond sequence;
    delay the detected channel bonding sequence for a predetermined period of time to produce a delayed channel bonding sequence;
    receive a channel bonding request at a second given time;
    determine whether the receiving of channel bonding request and the delayed channel bonding sequence are within a time window;
    when the receiving of channel bonding request and the delayed channel bonding sequence are within the time window:

align data with respect to data alignment of the master transceiver to produce aligned data; and synchronize the aligned data with data of the master transceiver.

41. The multi-gigabit transceiver of claim 40, wherein the memory further stores operational instructions that cause the processing module to determine whether the receiving of channel bonding request and the delayed channel bonding sequence are within the time window by:
determining whether the delayed channel bonding sequence occurs, in time, before the receiving of the channel bonding request;
when the delayed channel bonding sequence occurs before the receiving of the channel bonding request:
  initiating a first clock cycle count from the delay channel bonding sequence to establish the time window;
  determining whether the channel bonding request is received before expiration of the first clock cycle count; and
  when the channel bonding request is received before expiration of the first clock cycle count, determining that the receiving of channel bonding request and the delayed channel bonding sequence are within the time window;
when the delayed channel bonding sequence occurs after the receiving of the channel bonding request:
  initiating a second clock cycle count from the receiving of the channel bonding request to establish the time window;
  determining whether the delayed channel bonding sequence occurs before expiration of the second clock cycle count; and
  when the delayed channel bonding sequence occurs before expiration of the second clock cycle count, determining that the receiving of channel bonding request and the delayed channel bonding sequence are within the time window; and
when the delayed channel bonding sequence occurs at substantially the same time as the receiving of the channel bonding request, determining that the receiving of channel bonding request and the delayed channel bonding sequence are within the time window.

42. The multi-gigabit transceiver of claim 40, wherein the memory further stores operational instructions that cause the processing module to align the data with respect to the data alignment of the master transceiver to produce the aligned data by:
determining a unique hold time based on a difference between propagation delay of the master transceiver detecting the channel bonding sequence and the slave transceiver receiving the channel bonding request and a maximum propagation delay;
storing an address at which the channel bonding sequence was received by the slave transceiver to produce a channel bonding sequence address; and
determining a channel bonding write start address based on at least one of: the channel bonding sequence address, the channel bonding request, and the unique hold time.

43. The multi-gigabit transceiver of claim 42, wherein the memory further stores operational instructions that cause the processing module to synchronize the aligned data by:
adjusting a read pointer and a write pointer of the slave transceiver based on pointer separation, an address offset, and the channel bonding write start address, wherein the pointer separation corresponds to a difference between a master read pointer and a master write pointer of the master transceiver and wherein the address offset corresponds to byte positioning of the channel bonding sequence with respect to a word line of memory of the master transceiver.

44. The multi-gigabit transceiver of claim 40, wherein the memory further stores operational instructions that cause the processing module to, when the multi-gigabit transceiver is the master transceiver:
establish the predetermined period of time based on propagation delay between the master transceiver detecting the channel bonding sequence and the slave transceiver receiving the channel bonding request.

45. The multi-gigabit transceiver of claim 44, wherein the memory further stores operational instructions that cause the processing module to:
store an address at which the channel bonding sequence was received to produce a channel bonding sequence address; and
determine a channel bonding write start address based on the channel bonding sequence address and maximum propagation delay of channel bonding configuration information.

* * * * *